(12) United States Patent
Hawley et al.

(10) Patent No.: US 7,418,696 B2
(45) Date of Patent: *Aug. 26, 2008

(54) METHOD AND COMPUTER PROGRAM FOR RENDERING ASSEMBLIES OBJECTS ON USER-INTERFACE TO PRESENT DATA OF APPLICATION

(75) Inventors: David Hawley, Matsudo (JP); Hongbo Li, Kawasaki (JP); Jun Matsumoto, Tama (JP)

(73) Assignee: Sap Aktiengesellschaft, Walldorf ( * ) Notice: Subject to any disclaimer, the term of this patent is extended or adjusted under 35 U.S.C. 154(b) by 733 days.

This patent is subject to a terminal disclaimer.

(21) Appl. No.: 10/729,228

(22) Filed: Dec. 5, 2003

(65) Prior Publication Data

US 2004/0113930 A1    Jun. 17, 2004

Related U.S. Application Data

(63) Continuation of application No. 10/646,428, filed on Aug. 21, 2003, which is a continuation of application No. 10/257,510, filed as application No. PCT/EP01/04095 on Apr. 10, 2001, now abandoned.

(30) Foreign Application Priority Data

Apr. 11, 2000 (JP) ............................. 2000-109978

(51) Int. Cl.
*G06F 9/44* (2006.01)
*G06F 15/00* (2006.01)

(52) U.S. Cl. ................... 717/109; 717/120; 717/135; 717/140; 715/516; 715/526

(58) Field of Classification Search ......... 717/104–119; 715/516, 526
See application file for complete search history.

(56) References Cited

U.S. PATENT DOCUMENTS

| 5,335,320 | A |   | 8/1994  | Iwata et al. |
|-----------|---|---|---------|--------------|
| 5,974,256 | A | * | 10/1999 | Matthews et al. ............ 717/141 |
| 6,104,874 | A | * | 8/2000  | Branson et al. ............. 717/108 |
| 6,374,308 | B1| * | 4/2002  | Kempf et al. ............... 719/316 |

(Continued)

FOREIGN PATENT DOCUMENTS

WO    WO 99/04349    1/1999

OTHER PUBLICATIONS

Hong, A protocol software application generator, IEEE, Jun. 1989 pp. 240-243.*

(Continued)

*Primary Examiner*—Wei Y. Zhen
*Assistant Examiner*—Satish S Rampuria
(74) *Attorney, Agent, or Firm*—Fish & Richardson P.C.

(57) ABSTRACT

A user-interface of a device renders a first object and a second object, each object with data of a business application. The device is either of a first type or of a second type. In the device, an interpreter receives an application specification document with a statement. The statement indicates to render the first and second objects in an assembly. The interpreter identifies a presentation pattern for the assembly from predefined first and second presentation patterns according to the type of the device so that the assembly is rendered according to the presentation pattern.

14 Claims, 31 Drawing Sheets

U.S. PATENT DOCUMENTS

| | | | |
|---|---|---|---|
| 6,789,254 B2 * | 9/2004 | Broussard | 717/147 |
| 7,082,386 B2 * | 7/2006 | Srinivasa | 703/2 |
| 7,320,122 B2 * | 1/2008 | Chawla et al. | 717/109 |
| 2002/0077823 A1 * | 6/2002 | Fox et al. | 704/260 |
| 2003/0023953 A1 * | 1/2003 | Lucassen et al. | 717/106 |
| 2004/0117759 A1 * | 6/2004 | Rippert et al. | 717/100 |
| 2006/0248506 A1 * | 11/2006 | Luo et al. | 717/104 |

OTHER PUBLICATIONS

Usui, Application generators speed up development of acquisition/analysis/control systems, IEEE, May 1994 pp. 1507-1508 vol. 3.*

Shirogane et al., Method of user-customizable GUI generation and its evaluation, Dec. 1998 pp. 377-384.*

Abrams and Phanouriou, "UIML: An XML Language for Building Device-Independent User Interfaces," XML Conference Proceedings—Preceedings of XML, XX, XX, Dec. 1999.*

Kaashoek et al., Dynamic documents: mobile wireless access to the WWW, IEEE, Dec. 8-9, 1994, pp. 179-184.*

Khare et al., XML: a door to automated Web applications, IEEE, vol. 1 Issue: 4 Jul./Aug. 1997, pp. 78-87.*

Simonds et al., Software for the next-generation automobile, IEEE, vol. 5 Issue: 6 Nov.-Dec. 2003, IEEE, pp. 7-11.*

Khan et al., A distributed application model for mobile networks, IEEE, Dec. 8-9, 2003, pp. 157-163.*

Abrams and Phanouriou, "UIML: An XML Language for Building Device-Independent User Interfaces," *XML Conference Proceedings—Proceedings of XML, XX, XX*, Dec. 1999, 15 pgs. http://www.gca.org/attend/1999_conferences/xml_99/xml99_7tracks.htm—XML—1999 Enabling Business Innovation on the Web Conference Agenda, printed from the Internet Feb. 10, 2003, 31 pgs.

Abrams, "User Interface Markup Language (UIML) Draft Specification," Document Version 17 Jan. 2000, Language Version 2.0a, Copyright 2000 Harmonia, Inc., 64 pgs., Retrieved from the Internet: http://www.uiml.org/specs/docs/uiml20.

Hyatt, "the XPToolkit Architecture (TOC, Introduction, Overview of Packages)," Mozilla Cross-Platform (XP) Toolkit Documentation, 7pgs., Retrieved from the Internet: http://www.mozilla.org/xpfe/xptoolkit.

* cited by examiner

416 CUSTOMER LIST

| FILE | EDIT | TOOLS | | | |
|---|---|---|---|---|---|
| CUSTOMERS NOTIFICATIONS INSTALLATIONS | ID 1234 777 | NAME 415 abcd efg | AREA xyz stu | ADDRESS 412 mno klm | |
| | MODEL | ID 414 | DATE | DESCRIPTION 413 | |

| FILE | EDIT | TOOLS | | |
|---|---|---|---|---|
| ⁄⁄CUSTOMERS⁄⁄ NOTIFICATIONS INSTALLATIONS | 415 | CUSTOMER DETAIL 412 418 1234 abcd | | |
| | MODEL | ID 414 | DATE | DESCRIPTION 413 |

| FILE | EDIT | TOOLS |
|---|---|---|
| ⁄⁄CUSTOMERS⁄⁄ NOTIFICATIONS INSTALLATIONS | 415 | 412 |
| | DESCRIPTION 414 | 413 |

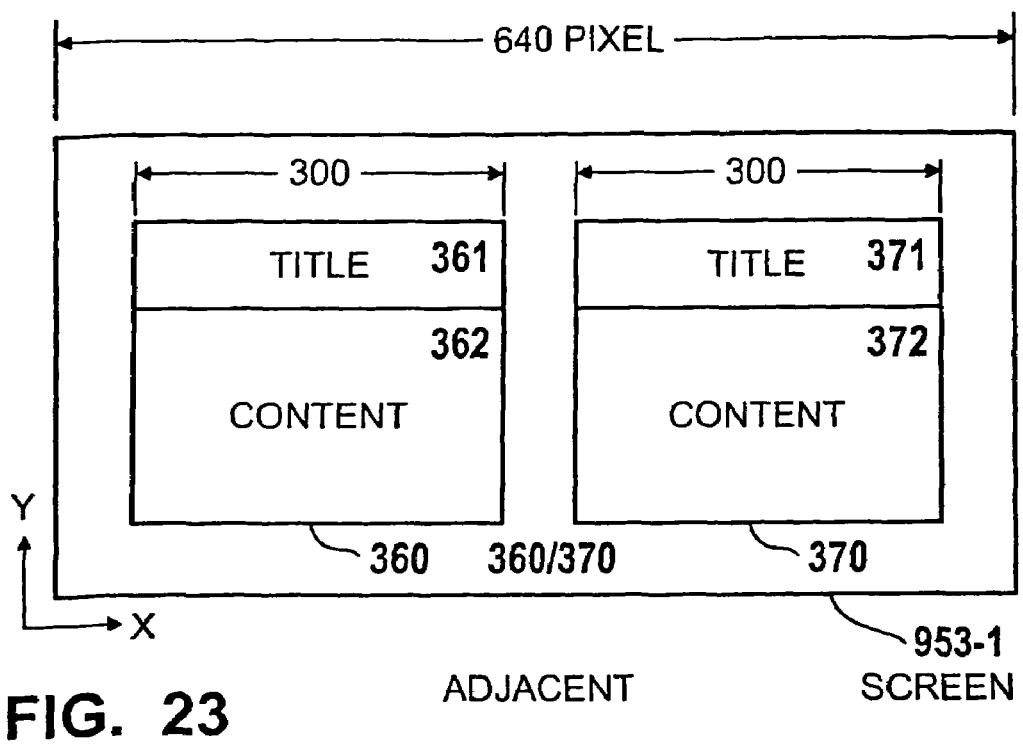
FIG. 23  ADJACENT SCREEN
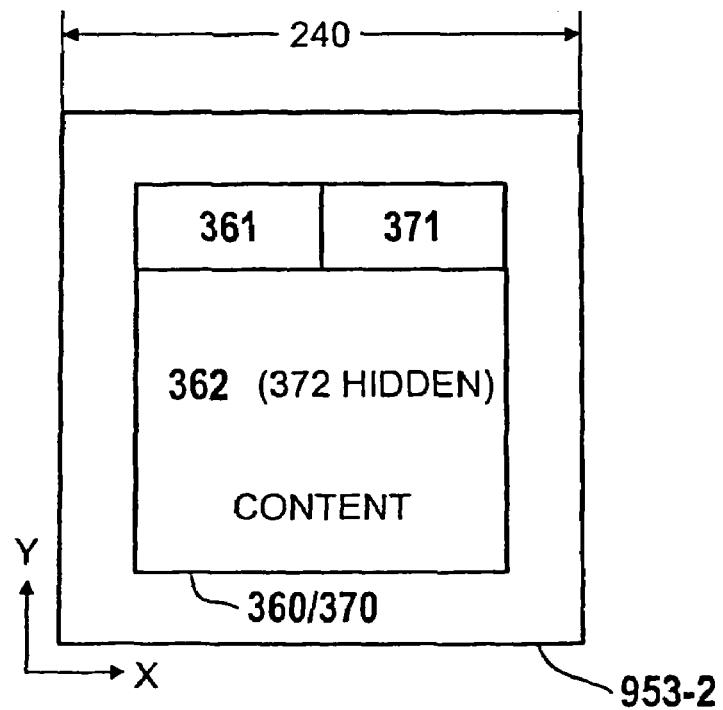
FIG. 24  OVERLAP SCREEN (1)  Welcome to the telephony sales force automation system. Please select an item from the main menu. They are customers, contacts and activities.

(2)  Contacts (3)  The selected item is contacts.

(4)  Search item with F (5)  There is one item. Item 1 ... of ... . The overview of the selected contact is as follows: The contact name is F... . The email address is F... @ ... .com. What would you like to do now? You can obtain information about the contact history for this contact. You can also obtain more information about this contact. Alternatively, you can go back to the main menu, or ask for repeating what you just heard.

(6)  Check the contact detail.

FIG. 25

METHOD AND COMPUTER PROGRAM FOR RENDERING ASSEMBLIES OBJECTS ON USER-INTERFACE TO PRESENT DATA OF APPLICATION

RELATED APPLICATION

This application is a continuation application of, and claims the benefit of priority under 35 U.S.C. 120 to, U.S. application Ser. No. 10/646,428, which was filed on Aug. 21, 2003. U.S. application Ser. No. 10/646,428 is a continuation of U.S. National Phase application Ser. No. 10/257,510, which was filed on Oct. 11, 2002 now abandoned. Application Ser. No. 10/257,510 is a U.S. National Phase Application for International Application No. PCT/EP01/04095, filed Apr. 10, 2001, which claims priority to Japan Patent Application No. 2000-109978, filed Apr. 11, 2000.

TECHNICAL FIELD

The present invention relates generally to the creation of applications for computing devices, and more particularly to presenting the applications on different computing devices that have different user-interfaces (e.g., size and shape), to creating applications which can be used in on-line or off-line operating modes of the computing device, and to defining classes of applications, wherein the applications share common user-interface models.

BACKGROUND

Recent technology development created an opportunity to hand over low-cost, low-maintenance small mobile ("pervasive") computing devices to professional and non-professional workers who are not always, or perhaps never, within reach of a desktop computer.

Such pervasive devices must be able to integrate with corporate data systems (such as SAP R/3 by SAP Aktiengesellschaft, Walldorf (Baden), Germany) and business processes that are enabled by information technology (IT).

When presenting the application, the devices render objects to the user-interface of the device. For example, the devices visually render screen objects (e.g., tiles) on a screen, or aurally render voice to a loudspeaker. Often layout information for each object and for each device is specified (i.e. "hard-coded") into the application specification. However, it is not desired to specify for each device type and for each object.

Furthermore, the current state of communication reliability, communication costs, and device battery capacity make it necessary to support disconnected ("off-line") as well as connected ("on-line") operating modes (of the computing device). Unfortunately, there is a shortage of tools to meet these requirements.

From the standpoint of application development, maintenance and deployment, there is a further additional challenge of supporting different computing devices. The computing devices are, for example, consumer devices with the Windows CE operating system (available for at least 4 different screen sizes), wireless telephones with micro-browsers, and traditional wire-bound telephones. As a further medium, voice can deliver corporate content via interactive voice response systems using telephone push buttons or voice-recognition and voice-synthesis.

Hence, there is a need to create customizable applications for pervasive computing devices. Further, since communication infrastructures are developing rapidly but unevenly throughout the world, the development method should support mixed on-line and off-line usage of the applications without imposing large discontinuities and resultant training costs on the users.

In other words, it is desired to provide server-based layouts that supports multiple implementations of different computing devices and that support multiple media.

SUMMARY

In one implementation, the present invention provides a method for rendering an assembly (i.e. a combination) of a first object and a second object on a user-interface of a device. The device is either of a first type or of a second type; the first and second objects present data of an application. The method comprises:

receiving an application specification document by the device, the application specification document having a statement with an indication to render the first and second objects in the assembly;

interpreting the statement of the application specification document to identify a presentation pattern for the assembly from predefined first and second presentation patterns according to the type of the device; and rendering the assembly of the first and second objects on the user-interface according to the presentation pattern identified in the interpreting step.

An indication to render the object in an assembly is given in the receiving step. While in the prior art, presentation statements include explicit presentation data for each single object; the inventive presentation statement is simplified and only indicates that the objects are presented in an assembly. The presentation statement (or "rendering statement") is sufficient to identify a presentation pattern by interpreting the statement when the user-interface of the device is taken into account.

In some implementations, prior to the receiving step, the method further comprises specifying the application in the application specification document by a workbench in a development computer, and simulating the rendering step by a pre-viewer component of the workbench.

Using the workbench allows the developer to confirm the presentation without using the device. The simulation presents a look-like of the objects. It also enables the developer to first specify the application for a device of the first type and then to adapt the application for a device of the second type.

In some implementations, in the rendering step, the first object and the second object are rendered not only according to the presentation pattern but also according to a predefined hierarchy pattern.

The hierarchy pattern is convenient for rendering objects that are related to each other in hierarchy. For example, the first object can be supra-coordinated over the second object. The hierarchy pattern can be defined as a sequence for consecutively rendering objects and as a definition of object locations (e.g., right-left, foreground-background).

In some implementations, the specifying step comprises writing the application in an application specification language, providing an interpreter that is specific for the application specification language, and storing the interpreter in the device.

Having the interpreter adapted to the application specification language and storing the interpreter in the device, allows to present the objects of the application even if the device is not coupled to an application server computer (off-line mode).

In some implementations, the predefined presentation patterns are stored by the interpreter. Storing the predefined presentation patters (or "themes") by the interpreter alleviates the developer from specifying presentation patterns in the statement itself.

In some implementations, the presentation pattern is a display pattern, wherein the objects are rendered to the user-interface being a screen, and wherein the presentation pattern is identified according to the screen size. In the embodiment of visual presentation, screen sizes of different devices are distinguished.

In some implementations, in the rendering step, the presentation pattern is an audio pattern.

In another implementation, the present invention provides a computer-program product to visually render a first object and a second object in an assembly on a screen of a computing device. The objects present data of a business application on a computer that is at least temporarily coupled to the computing device. The device is either of a first type or of a second type. The computer-program product has instructions that cause a processor of a computing device to perform the following steps:

receiving an application specification document from a computer, the application specification document having a statement with an indication to render the first and second objects in assembly; interpreting the statement of the application specification document to identify a visual presentation pattern for the assembly from predefined first and second visual presentation patterns according to the type of the device; and rendering the assembly of the first and second objects on the screen according to the visual presentation pattern identified in the interpreting step.

It is an advantage that the computer must not be permanently coupled to the computing device. It is sufficient to transfer the application specification document to the computing device before rendering the objects. The computing device is either of a first type or of a second type; the application specification document does not need to distinguish the type. The statement indicates to render the first and second objects in an assembly. It is not necessary to indicate details on how the objects are assembled. According to the device type, the suitable visual presentation patterns for the assembly is identified from predefined patterns that are, preferably, stored in the computing device.

In some implementations, the computer-program product is an interpreter that is located in the device.

In some implementations, the interpreter is located in a further computer. This has the advantage that devices with low computing power like conventional phones can render the application as well.

In some implementations, the computer-program product is, optionally, embodied by a program signal that is conveyed to the computing device.

In some implementations, the computer-program product is, optionally, embodied by a program carrier.

In another implementation, the present invention also provides a computer-program product that resides in a computing device of either a first type or a second type, the computer-program product for interpreting an application specification document and causing a processor of the computing device to render a first object and a second object in combination to a user-interface of the device, the computer-program product having a plurality of instructions to control the processor, the computer-program product characterized in the following:

A first sub-plurality of instructions form a theme-handler to evaluate a statement of the application specification document, the statement instructing to render the first and second objects in an assembly according to a device type specific presentation pattern for the assembly that is identified from predefined first and second visual presentation patterns.

A second sub-plurality of instructions form a navigation engine to select one of the first and second objects for interaction with a user to create inter-object relations with user-interface elements and data cursors.

In some implementations, the computer-program product is, optionally, delivered to the device by a program signal.

In some implementations, the computer-program product is, optionally, delivered to the device by a program carrier.

In another implementation, the present invention provides a method to create an application system operating with a computing device. The method comprises the following steps:

a first step to define a user-interface model; a second step to define an application specification document by a meta-language; a third step to customize a workbench component that identifies constraints on the validity of the application specification document; a fourth step to define layout themes for the computing device; a fifth step to realize the user-interface model in an interpreter component; and a sixth step to realize the layout-themes in the interpreter component.

In some implementations, the first step comprises: determining the types of tiles and the functionality of tiles; the tiles being elements of the user-interface model; determining relationships between the tiles in an assembly, and determining a navigation state and the required user operations on the navigation state.

In some implementations, the second step comprises: defining specifications to the types of tiles; defining attributes to express properties of the tiles; and defining attributes in the navigation state.

In some implementations, the fourth step for each computing device comprises: defining a representation on the output media of device for each element of the user-interface model; and defining the user-interface model for each operation of the user-interface model.

In some implementations, the fifth step comprises: creating models to specify the tiles and the assembly; implementing constructors to create user-interface instances from the application specification document; and implementing the user-interface instances from the models in a computer programming language.

In some implementations, the sixth step comprises for each theme: implementing each layout-theme as a layout handler; and obtaining a selection of the layout-theme by a developer and forwarding the selection to the interpreter component.

In other words, solutions by the present inventions are summarized as follows:

(a) It is a task of the present invention to define a framework, wherein the framework defines classes of applications that share a common user-interface model.

By defining a dedicated rendering statement in application specification language, and by adapting an interpreter, the present invention allows to create applications for different types of computing devices, even if the device is not yet present when the application is developed. Since the statement is not specific to a single application, the statement can be re-used for further applications (classes).

(b) It is a further task of the present invention to define a method for creating an application development system (hereinafter "application system") for each particular user-interface model.

In such a system, a workbench component assists the developer to build the application and to simulate the application for a particular user-interface component of a particular device.

(c) It is a further task of the present invention to provide a method of defining computer-programming languages (CP-languages) to specify particular applications of the user-interface model.

The present invention takes advantage of language definition schemes. The possibility of creating content statements in schemes (e.g., XML scheme) is used to create the rendering statement. The language corresponds to the user-interface model with its components (e.g., tiles, assemblies, navigation).

(d) It is a further task of the present invention to provide an interpreter component for different computing devices, wherein the interpreter component executes the application by implementing the user-interface model.

The present invention allows to specify the interpreter and to simulate the interpreter by the workbench component. It is possible to build a single interpreter for a plurality of different devices, and also possible to build different interpreters for each device type.

(e) It is a further task of the present invention to provide a layout component (so-called "layout theme") in the interpreter component, wherein the layout component implements the user-interface model corresponding to each computing device. In other words, the themes are device-specific layouts for the user-interfaces (96q, e.g., screen, speaker) of the devices.

(f) It is a further task of the present invention to provide for off-line, on-line and mixed operation modes of the applications with the same user-interface model and implementation.

(g) It is a further task of the present invention to enable the interpreter component (200) to synchronize data between the computing device (901/902/903) and the server computer 900 (or plurality of computers 900).

This is accomplished by data synchronization services in the interpreter.

(h) It is a further task of the present invention to enable the interpreter component to reflect data changes in the user-interface without explicit action by the user when a server computer initiates data.

(i) It is a further task of the present invention to provide techniques for improving the performance of the interpreter component on computing devices such as portable phones, conventional phones, handheld computers. The present invention can be used by such different computing devices.

DESCRIPTION OF DRAWINGS

FIG. 8 illustrates the presentation of the pre-viewer components for a first type of computing device;

FIG. 9 illustrates the presentation of the pre-viewer components for a second type of computing device;

FIG. 10 illustrates the presentation of the pre-viewer components for a third type of computing device;

FIG. 15 illustrates an overview of the architecture of the interpreter component;

FIG. 16 illustrates a detail of the operation of a parsing services component of the interpreter component;

FIGS. 17-20 illustrate a series of views on computer screens of computing devices of different types;

FIG. 17 illustrates a series of views of a computer screen of a computing device of a first type, for example, a personal computer;

FIG. 18 illustrates a series of views of a computer screen of a computing device of a second type, for example, a further personal computer;

FIG. 19 illustrates a series of views of a computer screen of a computing device of a third type, for example, a still further personal computer;

FIG. 20 is a series of views of a simulated display of a wireless telephone with micro-browser illustrating the server-side interpreter components WAP-theme;

FIG. 23 illustrates the screen of the device of the first type, the screen rendering two objects adjacent (first predefined presentation pattern);

FIG. 24 illustrates the screen of the device of the second type, the screen rendering two objects overlapping (second predefined presentation pattern);

FIG. 25 is a transcript of a dialog conducted over a telephone between a user and on the interpreter component operating on a server computer with a voice theme executing the an application.

Like reference symbols in the various drawings indicate like elements.

DETAILED DESCRIPTION

Figure 1:
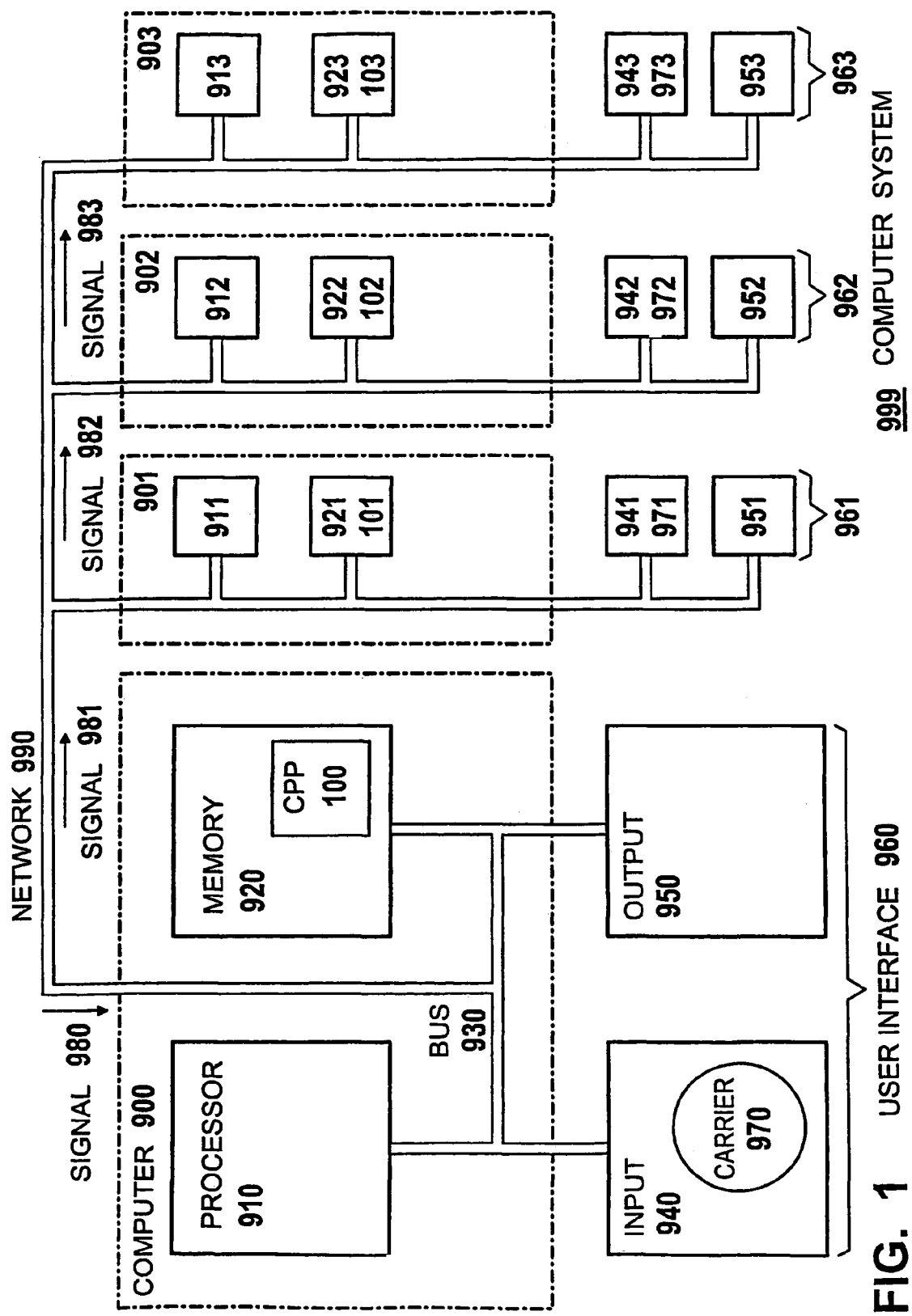
FIG. 1 illustrates a simplified block diagram of a computer network system having a plurality of computers operating according to the present invention.

For convenience, a list of reference numbers is provided prior to the claims.

As used herein, the term "developer" refers to a person who creates application 300 by interacting with workbench component 250 to create and assemble instances of language elements that form an application specification document 240. Preferably, the developer interacts with computer 900 (cf. FIG. 1). As used herein, the term "user" refers to a person who accesses application 300 on a computing device (such as computer 901/902/903, cf. FIG. 1, computer 903).

As used herein, the terms "theme" refers to the design of user-interface objects that create a distinct visual appearance, audible environment and behavior of the user-interface model. The theme comprises, for example, a presentation pattern and a hierarchy pattern.

Method steps are explained by function of components. Persons of skill in the art are able to implement method steps as computer program instructions, in a programming language, such as C++.

The present invention allows to specify application 300 at a high level, and optionally to specify applications 300 for a particular medium (or "form-factor") and device.

For this purpose, a family (or "class") of declarative application specification languages (AS-language) is created. The AS-language expresses: data-model component 204, integration of data-model component 204 with corporate data (e.g., in database 201), and user-interface component 340.

For each AS-language, interpreter component 200 (cf. FIG. 1) interprets an application specification document 240 and presents application 300 to the user by using user-interface component 340 in device 901/902/903. Interpreter component 200 provides a basic user-interface framework. The framework comprises a navigation model, binding data to user-interface elements, data-services such as validation, inter-object relationships and navigation, data-event control, and capture of data changes, and middleware-services such as data synchronization, and virtual request-reply.

The functionality of built-into interpreter component 200 is enhanced by common scripting languages, or is enhanced by custom object components on COM or similar technologies.

Interpreter component 200 comprises data synchronization services 218 (cf. FIG. 5) to provide integration between the computing device and the server.

While the basic operating mode of device 901/902/903 is off-line, interpreter component 200 supports the combination of off-line and on-line modes. Interpreter component 200 simulates the "request-response" style of interaction that the user expects from an on-line connection between computing device 901/902/903 and server computer 900.

Interpreter component 200 presents this appearance by ensuring data-synchronization in near real-time ("RealTime-DataSync") and ensuring that data changes that result from synchronization are reflected on the user-interface ("change reflection") without an explicit user action (as the results become available).

Interpreter component 200 provides data synchronization through messaging services and communication services of computing devices 901/902/903; such services are available in standard device configurations.

Interpreter component 200 accommodates changes by a data synchronization layer that is coupled to a user-interface data-event layer. When the server changes data, the changes are automatically propagated to the elements of the user-interface.

FIG. 1 illustrates a simplified block diagram of the computer network system 999 having a plurality of computers 900, 901, 902 (or 90$q$, with q=0 ... Q–1, Q any number).

Computers 900-902 are coupled via inter-computer network 990. Computer 900 comprises processor 910, memory 920, bus 930, and, optionally, input device 940 and output device 950 (I/O devices, user-interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the developer, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the Internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Computer 900 is also referred to as "server computer".

Computer 900 stores database 201 (cf. FIG. 5, "data source") that supplies data for application 300. Preferably, computer 900 stores database 201 in memory 920.

Computer 901/902/903 is hereinafter referred to as "computing device" 901/902/903. For simplicity, reference numbers are sometimes left out. Computing device 901/902/903 can be of different types.

Figure 5:
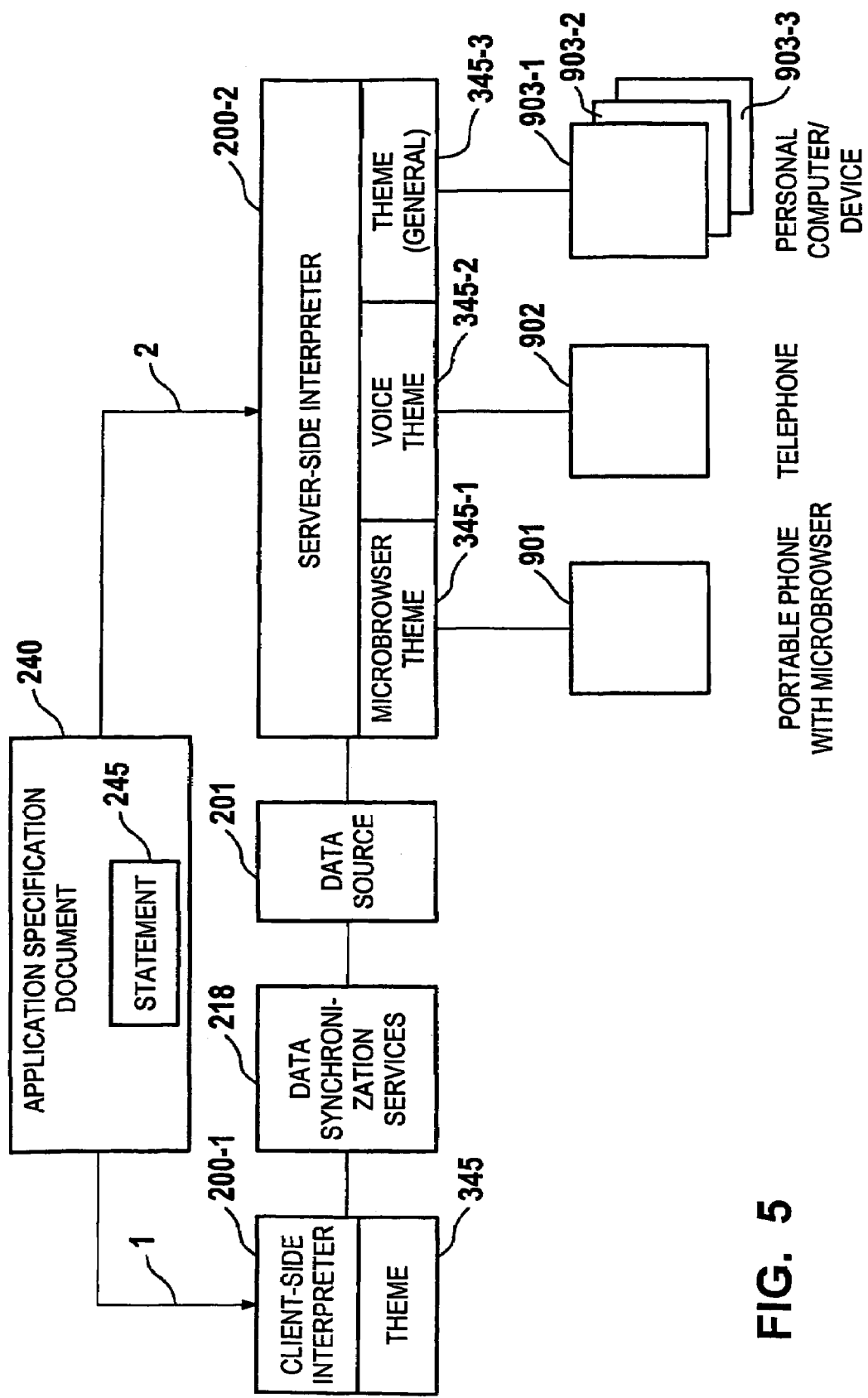
FIG. 5 illustrates the range of deployment configurations for the application.

Computing device 901 is a portable phone with a microbrowser, computing device 902 is a conventional phone without a browser (portable or fixed-wired phone), and computing device 903 is a personal computer (cf. FIG. 5). Where convenient for explanation (in connections with FIGS. 17, 18, 19), personal computer 903 is distinguished into computers 903-1, 903-2 and 903-3.

Computer 900 and device 901/902/903 are in a client-server relation. For convenience of explanation, device 901/902/903 is regarded as the "client" and computer 900 is regarded as the "server". Usually, computer 900 and device 901/902/903 are located separately; this is sometimes expressed by the term "remote" in connection with computer 900.

Among other things, the present invention has the advantage to provide the desired server-based layout that support multiple implementations of different computing devices and that support multiple media.

A further advantage of the present invention is in the following: When device 901/902/903 presents an application to the user, device 901/902/903 can operate either in an on-line operating mode (exchange data with computer 900) or in an off-line operating mode (no data exchange). Both operating modes can be combined ("mixed" mode).

A further advantage of the present invention is in a data-centric approach. Database 201 in computer 900 operates independently from application system 200/250/260 of the invention. Changes of the application system 200/250/260 do not require changes of database 201.

Having described hardware implementations in FIG. 1 is convenient for further explanation of computer program product 10*q*. To distinguish software from hardware, the term "component" and "model" refers to portions of computer program product 10*q*. For example, a "user-interface component" is therefore a sequence of code that cause processor 91*q* and user-interface 96*q* to operate. Throughout the following, terms in single quotation marks ' ' indicates non-limiting examples of content. In the figures, names, email-addresses and the like are abbreviated using ellipsis; other content data is symbolized by lowercase alphabetic triples like 'abc', 'def' and the like.

Figure 2:
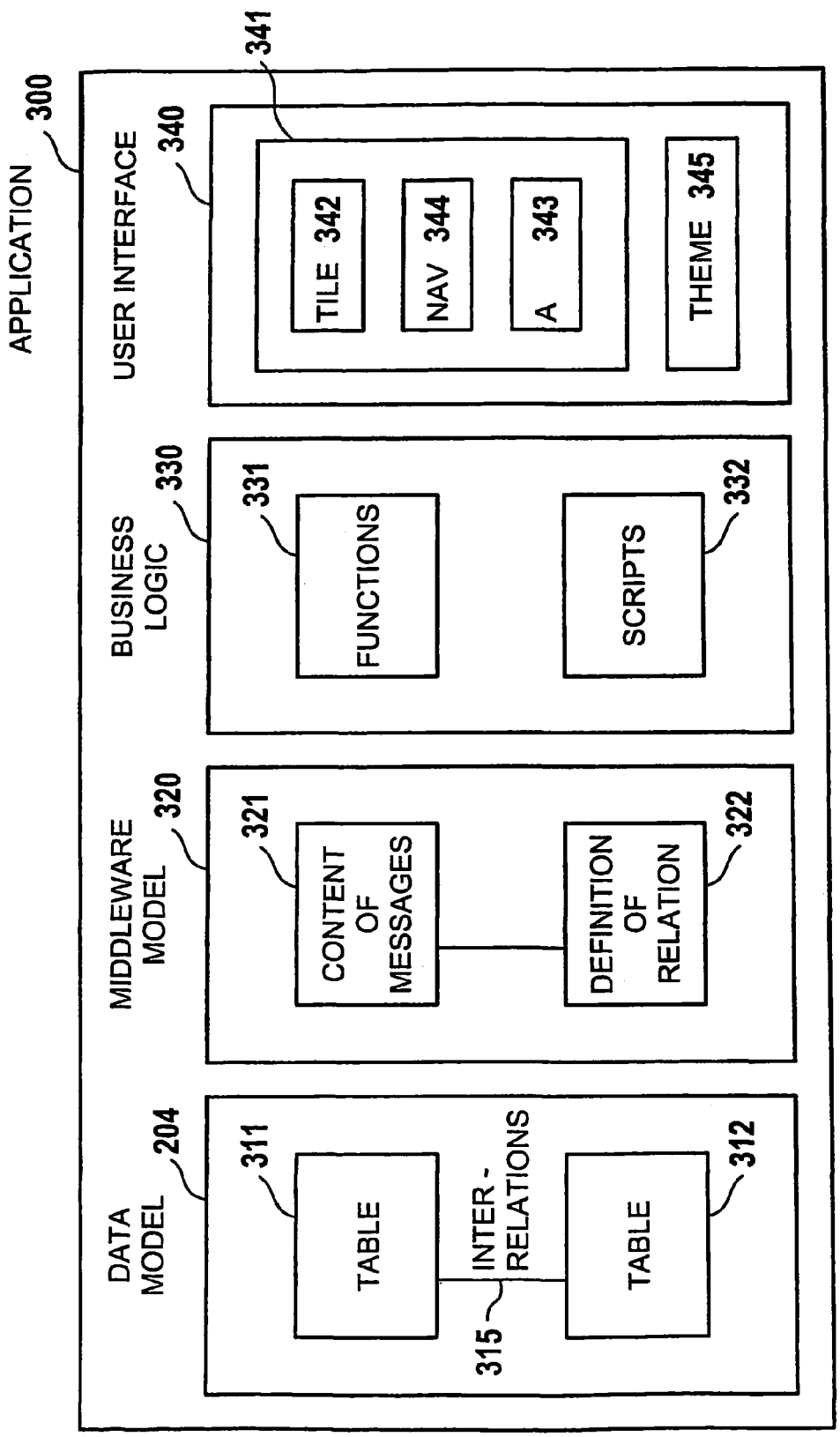
FIG. 2 is a simplified diagram of an application.

FIG. 2 is a simplified diagram of application 300. Application 300 is a combination of several related components, in accordance with the following. Application 300 is a combination of data-model component 204, middleware-model component 320, business-logic component 330, and user-interface component 340, that is:

$$\text{application } 300 = \text{data-model component } 204 \text{ (cf. } FIG. \text{ 15)} +$$
$$\text{middleware-model component } 320 +$$
$$\text{business-logic component } 330 +$$
$$\text{user} - \text{interface component } 340$$

Application specification languages (AS-languages) address each of these components 204, 320, 330, 340 of application 300.

In application 300, it is not necessary for all of these components 204, 320, 330, 340 to be present.

The components are now explained with more detail:

Data-model component 204 defines local data on which application 300 acts. Data-model component 204 comprises tables 311, 312, and interrelation 315 between tables 311, 312.

Middleware-model component 320 defines content of messages 321 that are exchanged between computing device 901/902/903 and server computer 900 to accomplish data synchronization, and defines relations 322 between messages 321 and tables 311, 312 of data-model component 204.

Business-logic component 330 comprises a pool of functions 331 and scripts 332 that are associated with various application events.

User-interface component 340 defines how the user interacts with application 300. User-interface component 340 comprises the following elements: user-interface model 341, and theme 345. User-interface model 341 comprises tile 342, assemblies 343, and navigation state 344. It is an advantage of the present invention, that model 341 is not specific to application 300; in other words, model 341 can be used for a plurality of different applications. Tile 342 is a view of an application-level object, such as customer, contact etc.

Assemblies 343 are pluralities of tiles 342 and interrelations between tiles 342, for example, a plurality of views of related business objects. Navigation state 344 is a model of the state and operations of user-interface model 341, with access, instantiation and transition between tiles 342 and assemblies 343. Optionally, navigation state 344 memorizes previous states. Theme 345 is a presentation of user-interface model 341 on a particular type of computing device.

The realization of theme 345 may require additional "state" information to represent the status of the presentation (of application 300) at runtime; this information is logically associated with navigation state 344 and extends navigation state 344.

The above definitions of application 300 (cf. FIG. 2) define a family of application models parameterized by concrete definitions of tile 342, assemblies 343 and navigation states 344.

The developer chooses particular tile 342, assemblies 342 and navigation state 344. When choosing, the developer thereby sets the requirements for the AS-language to specify application 300 in compliance with corresponding user-interface model 341. Resulting application 300 is presented on different computing devices (and media) in accordance with theme 345 suitable for each particular computing device (and medium).

In the following, user-interface model 341 is described in first and second implementations 341-1, 341-2. For convenience, indices 1 and 2 are added to reference numbers 341-345.

The first implementation 341-1 of user-interface model 341 is the so-called MDF-model or "tile-set stack model". As mentioned, user-interface model 341 is defined by tile 342-2, assembly 343-1 and navigation state 344-1.

Tile 342-1 combines user-interface elements that are displayed in fields within a particular business object type. For example, tile 342-1 'customer detail' belongs to the business object type 'customer'. Individual user-interface elements of tile 342-1 belong to fields such as 'customer number', 'name', and 'industry type'.

Assembly 343-1 is a plurality of tiles 342-1 that are organized in a hierarchy (or collection of hierarchies). One or more tiles 342-1 are designated as main tile; each main tile is the root of a tree of sub tiles. A sub tile is related to main tile (parent) by a query on the set of all data items that are associated with the sub tile. The query is parameterized by properties of the currently selected item in the main tile. For example, when the user selects 'customer' in the main tile, related 'sales orders' in a sub tile are automatically selected and displayed. Hierarchy is generally explained in connection with FIG. 21 (pattern 299, main object 360, sub object 370).

Figure 17A:
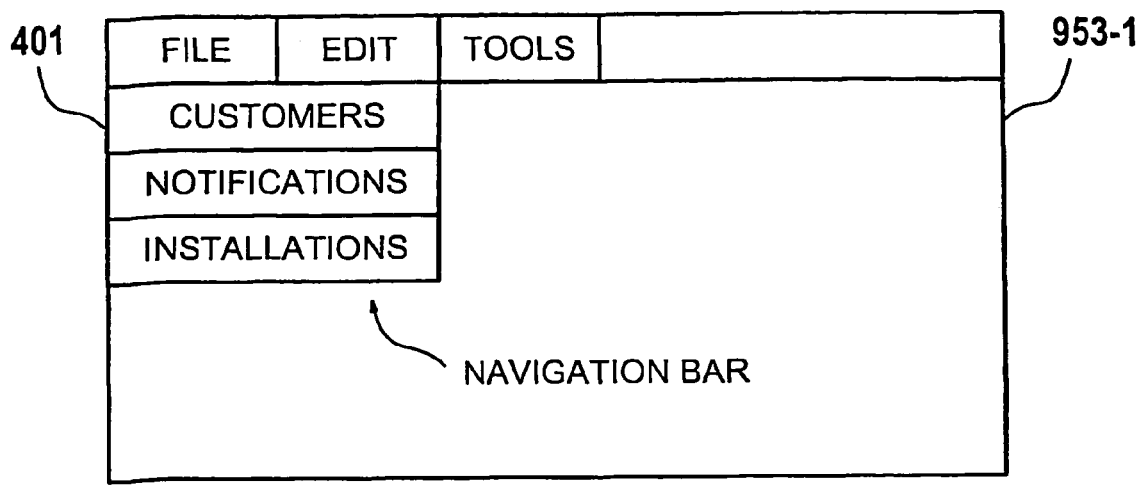
Figure 17B:
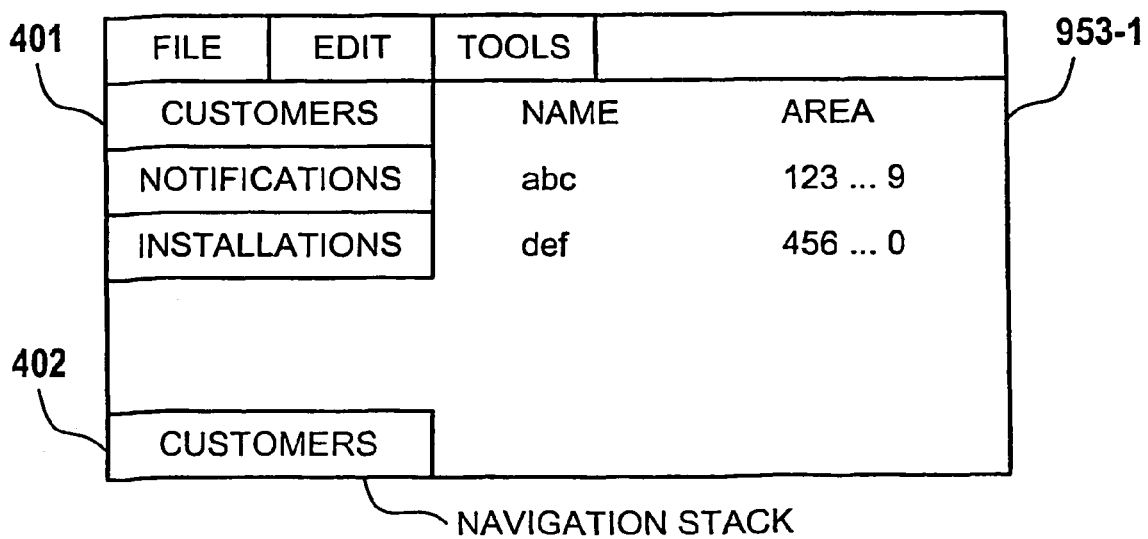

Navigation state 344-1 comprises instantiated assemblies 343-1 that are displayed as a stack (cf. navigation stack 402 in FIG. 17B). Conveniently, assembly 342-1 displayed at the top of the stack is the current assembly 342-1. Preferably, the user can interact only with current assembly 343-1. Logically, all tiles 342-1 are presented to the user simultaneously. However, theme 345 for a particular computing device may require the user to explicit perform some action to access individual tiles 342-1.

Such actions do not affect navigation stack 402 (cf. FIG. 17B). Executing a hyperlink (cf. 403 in FIG. 17C) in one of tiles 342 can create a new instance of a tile assembly. In that case, the new instance is pushed onto the top of the stack. Discarding the top of the stack can reverse this operation. Some tile assemblies are distinguished as top-level tile assemblies; instances of such tile assemblies are created directly, in which case the stack is cleared prior to creating the new instance. User-interface model 341, and the corresponding AS-language, is a preferred embodiment. Table 1 (cited at end of specification) explains an example AS-language for this model.

The second implementation 341-2 of user-interface model 341 is a so-called "pervasive workflow model" or "dialog model". Implementation 341-2 is suitable for simple workflow applications 300, where the user is required to make a choice step at a particular point in application 300.

As used herein, the term "workflow" is a sequence of predefined interactions of the user with device 901/902/903. For example for a workflow 'vacation request approval', the user (who likes to request vacation) first inputs his/her name (as 'requestor'), second inputs the desired vacation dates (as 'date'), third inputs a 'reason', and so on. The choice step is based on a small amount of predetermined data. The choice step can be presented on a mobile computing device (e.g., device 901 or 903).

User-interface model 341-2 for this scenario is described by the following definitions:

Tile 342-2 is a plurality of user-interface elements that are displayed in fields on a workflow container. For example, the workflow container for 'vacation request approval' would have user-interface elements such as 'requestor', 'date', and 'reason'. Since assembly 343-2 preferably, comprises only a single tile 342-2, assembly 343-2 and tile 342-2 are not distinguished.

Navigation state 344-2 comprises a single instantiated tile 342-2, designated by the user as the "current tile". The user can only interact with this "current tile". In order to designate an instantiated tile 342-2 as "current tile", all tiles 342-2 are available in a pool that the user can access.

The user may return an instance back to the pool by selecting another instance from the pool. Optionally, the user indicates that processing of the tile instance is complete, whereupon the tile is logically removed from the pool. the user may also initiate a new tile instance and add it to the pool, by selecting from a list of tiles defined in application 300. User-interface model 340 can be elaborated to manage a tile instance pool of more complexity; for example, the workflow represented by each tile instance could have an associated priority or additional states.

Figure 3:
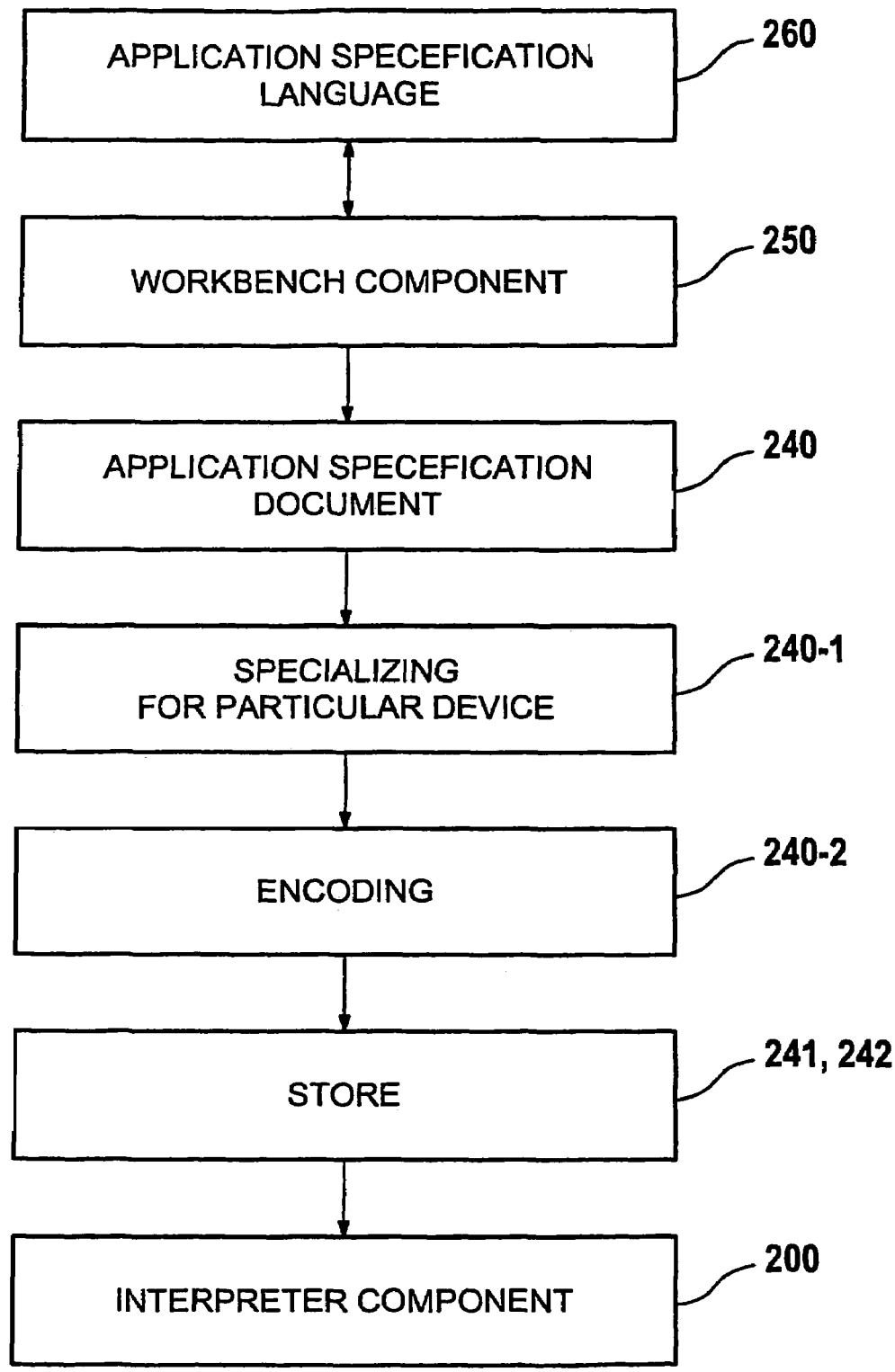
FIG. 3 is an overview of the process for creating the application.

FIG. 3 shows the steps in creating an application by the developer. Application 300 is defined in the context, and by usage, of components of application system 200/250/260. Workbench component 200 assists the developer in creating an application specification document 240. Application specification document 240 is compliant with the AS-language 260 and thus compliant with the application model (including the specific panel-, assembly- and navigation-specific user-interface model 341). The method of developing application 300 comprises the following steps: creating application specification document 240; encoding (cf. FIG. 3, 240-2) application specification document 240 into interpreter-readable document 241; and storing interpreter-readable document 242. Preferably, the steps are performed by computer 900.

In step creating application specification document 240 (cf. FIG. 3), the developer interacts with workbench component 250 of application system 200/250/260 to specify application 300 in application specification document 240. Step creating optionally comprises to specialize application specification document 240 for particular device 901/902/903 (cf. FIG. 3, "specializing for particular device" 240-1).

In step encoding, workbench component 250 transforms application specification document 240 into interpreter-readable document 241 (cf. FIG. 3).

In step storing, workbench component 250 stores interpreter-readable document 241 in storage system 242 (cf. FIG. 3) so that interpreter component 200 can retrieve and execute document 241 upon request.

Application specification document 240 is an XML-document that conforms to a particular AS-language 260. Such AS-languages are specified in a meta-language. Examples for meta-languages are "document type definition" (DTD) or "XML schema", both well known in the art. The preferred embodiment of the present invention uses "XML schema". Preferably, workbench component 250 is an XML document editor that assists the developer in creating application specification document 240.

The editor validates application specification document 240 and edits context-sensitive to ensure compliance with the AS-language. The developer creates a new application specification document 240 by invoking a start command from a menu in workbench component 250.

Subsequently, the developer modifies the document by adding or deleting XML-elements, or by adding, modifying, or deleting attributes of these elements. Operations on elements are performed through user-interface actions on the tree-viewer, while operations on element attributes are performed through element attribute panel 254 (cf. FIGS. 6, 7, 13, 14).

Figure 4:
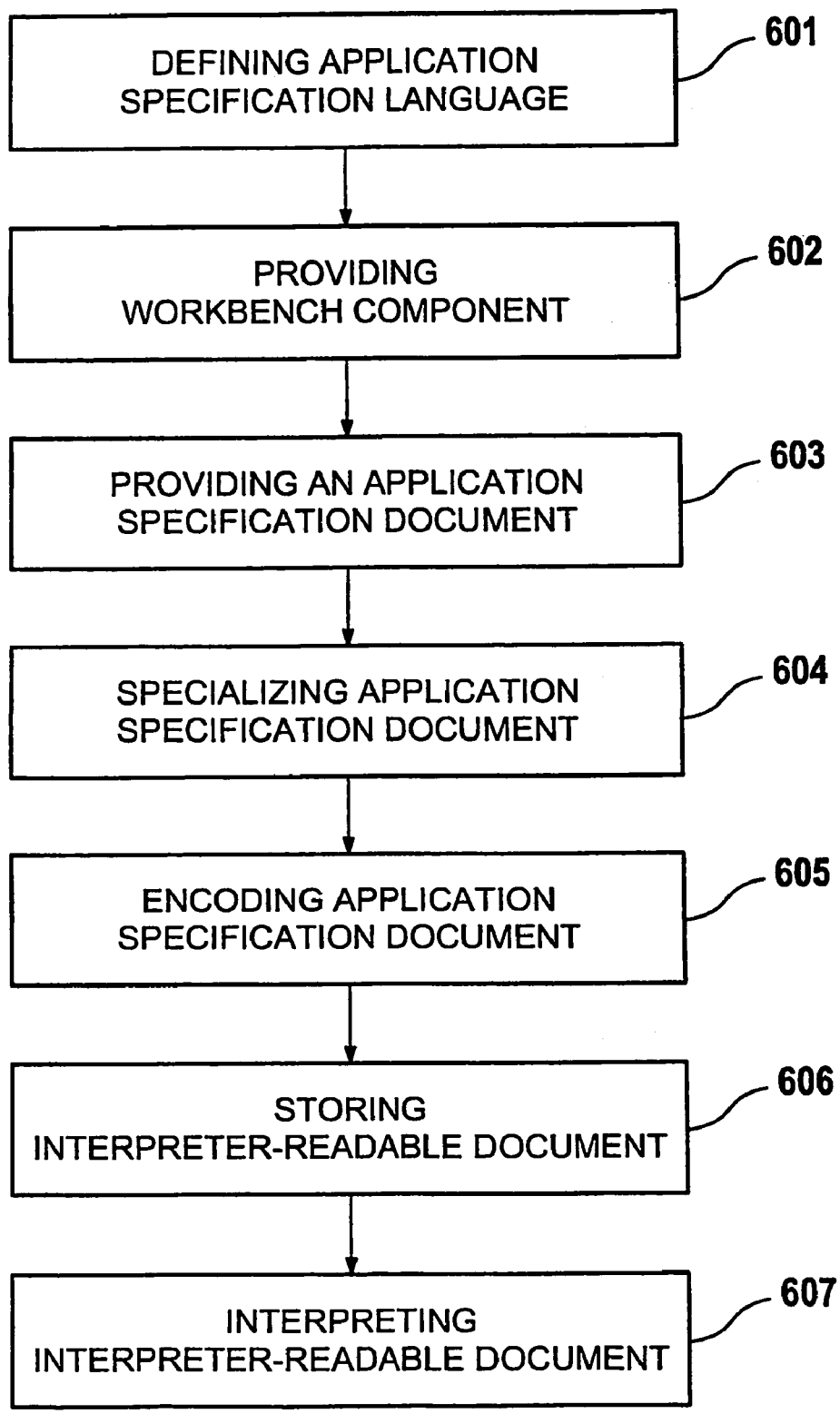
FIG. 4 is a simplified flow chart diagram of the process of FIG. 3.
Figure 6:
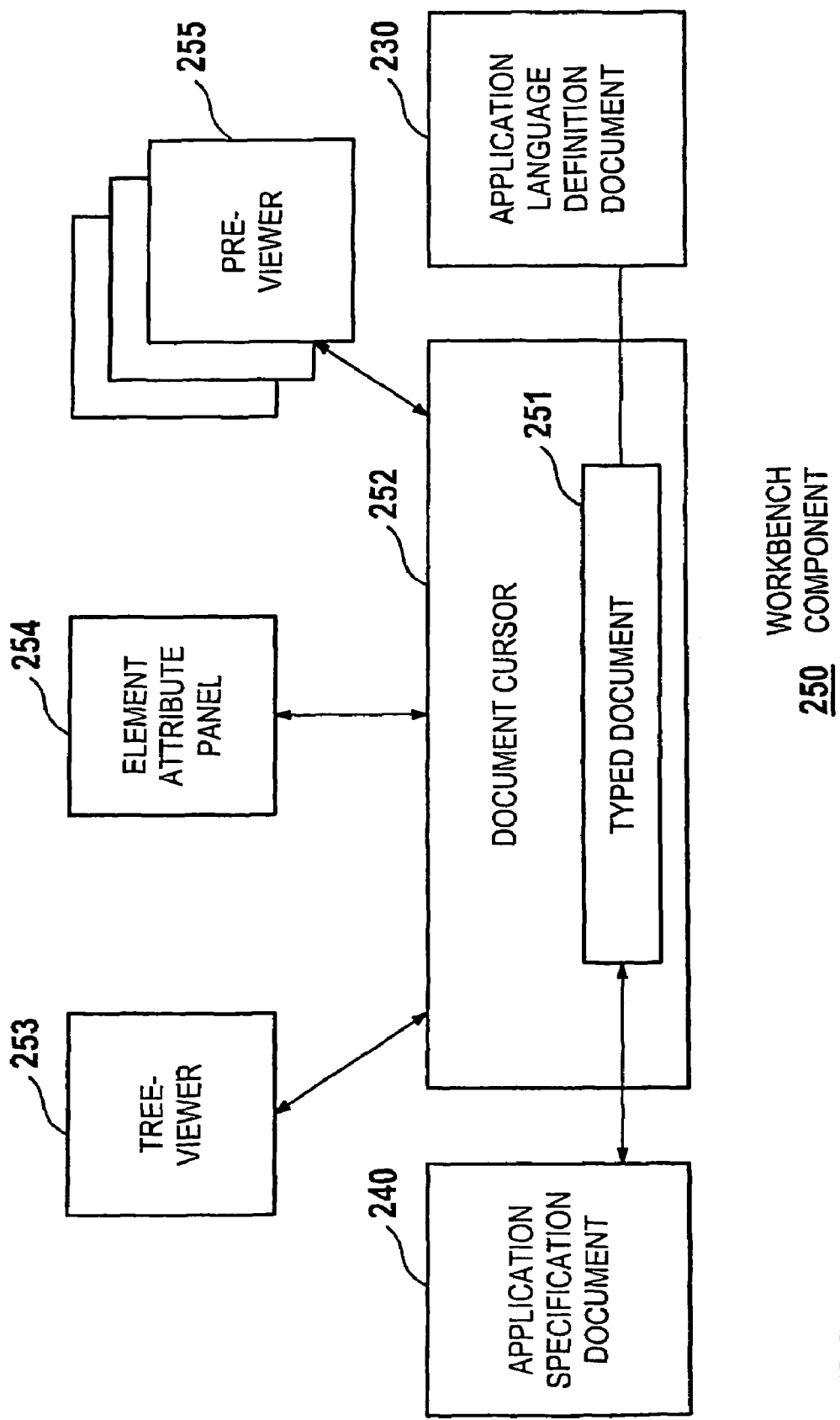
FIG. 6 illustrates an overview of the architecture of the workbench component.

FIG. 4 is a simplified flow chart diagram of process 600 (cf. FIG. 3). Process 600 comprises:

601 defining an application specification language (AS-language) in application language definition document 230 (cf. FIG. 6). This step is optional, once defined, the AS-language can be used for different applications.

602 providing workbench component 250 (cf. FIG. 6). Preferably, this step is performed once. The step can be repeated for new AS-language definitions.

603 providing an application specification document 240 (with statement 245) by using application language definition document 230 and workbench component 250. Typically, this step is performed by the developer.

604 specializing application specification document 240 for computing device 901/902/903. This step is typically performed by workbench component 250 in interaction with the developer.

605 encoding application specification document 240 into interpreter-readable document 241 (cf. FIG. 3). The format might vary for each interpreter, so this step is optional. Application specification document 240 can also be prepared in interpreter-readable form.

606 storing interpreter-readable document 241. The developer creates the application at a different time as the user uses the application.

607 interpreting interpreter-readable document 241 by interpreter component 200 to present application 300 to the user of device 901/902/903.

FIG. 5 illustrates the range of deployment configurations for an application. Not all elements in FIG. 5 are actually required. The configuration comprises client-side interpreter component 200-1; micro-browser theme 345-1, voice theme 345-2, theme 345-3 (collectively theme 345, synonym "presentation pattern"), computing device 901 (wireless, portable phone), data synchronization services 218, database 201 ("data source"), server-side interpreter component 200-2, application specification document 240 (with statement 245).

As arrows 1 and 2 indicate, application specification document 240 is read by client-side interpreter component 200-1 or by server-side interpreter component 200-2. For simplicity, optional formatting document 240 into interpreter-readable document 241 is not illustrated. The distinction between client-side and server-side is convenient, but not necessary for the present invention. Preferably, client-side interpreter 200-1 resides in memory 921/922/923 of device 901/902/903 and controls how processor 911/912/913 of device 901/902/903 executes the application (cf. FIG. 1). Server-side interpreter component 200-2 symbolizes that devices 901/902/903 do not need to have interpreter component 200 and that interpreter component 200 is optionally installed on a separate computer (not illustrated here). This is convenient, when the computing capacities of device 901/902/903 are limited. In other words, it is not important where interpreter component 200 is actually located and executed: in the device or in the separate computer (not shown). Since the location of interpreter is not important, interpreters 200-1 and 200-2 are collectively referred to as "interpreter component 200". Interpreter component 200 is part of computer program product 101/102/103. As indicated in the boxes of interpreters 200, themes are associated with interpreter component 200. For convenience, the term, "component" is sometimes omitted. In case that interpreter 200 serves device 901 (wireless, portable phone), theme 345 is a micro-browser theme. In case that interpreter 200 serves device 902 (conventional telephone), theme 345 is voice theme 345-2.

The following description explains an "application system" 200/250/260 as a tool to create applications that share particular user-interface model 341. Application system 200/250/260 comprises: an application specification language 260 (AS-language), workbench component 250 (cf. FIG. 6), and interpreter component 200 (cf. FIG. 3).

AS-language 260 defines the language elements required to express application 300 in user-interface model 341.

As mentioned above, the developer uses workbench component 250 to create and assemble instances of elements of AS-language 260 to form the application specification. Interpreter component 200 executes the application specification and presents the user-interface on the computing device.

A preferred embodiment of the syntax of the AS-language is the "Extensible Markup Language" (XML). The use of the term "XML" in this context refers to the World Wide Web Consortium specification of XML, as well as encoding schemes for XML into binary or other forms that preserve the XML structure (cf. FIG. 3 encoding 240-2).

Another preferred embodiment of the syntax is a binary encoding (240-2) of XML, "WAP binary XML encoding". For defining the AS-language, preferably, the meta-language is "XML schema".

FIGS. 6-14 illustrate workbench component 250. As mentioned, workbench component 250 is the tool by that the developer creates applications. Document browsing and editing functions of workbench component 250 comply with the AS-language.

Optionally, customization of workbench component 250 may be required to realize document validity criteria not adequately expressed by the meta-language (in which the AS-language is defined).

FIG. 6 illustrates an overview of the architecture of workbench component 250. Preferably, workbench component 250 comprises the following components and documents: typed document component 251; document cursor component 252 associated to the typed document; tree-viewer component 253; element attribute panel component 254 for browsing and editing typed document 251; application language definition document 230; as well as a plurality of pre-viewers components 255 for simulating the final presentation of document 251 by computing device 901/902/903.

Typed document component 251 uses the AS-language definition: to understand the structure of application specification document 240 and to determine valid edit operations on each element and attribute.

Typed document component 251 provides application programming interfaces (API, not shown in FIG. 6): to load AS-language 260, to create, to load and to save (in storage 242) application specification document 240, and to provide information on valid edit operations to other components to control their operation.

Any changes to application specification document 240 are broadcasted to all other components. The other components update their internal state and displays accordingly.

Component 252 contains a reference to a distinguished element in the application specification document 240 to designate this distinguished element as "current element" ("current element reference").

Tree-viewer component 253 and pre-viewer components 255 browse the elements of document 251. Components 253, 255 update current element references by calling a document cursor API. Document cursor component 252 broadcasts the updated current element reference to all components 253, 254, 255. Components 253, 254, 255 update their internal state and screen displays accordingly.

Tree-viewer component 253 displays document typed document 251 in a hierarchy that mirrors the actual structure of document 251. Tree-viewer component 253 has context-sensitive menus to delete elements from document 251 or to insert elements into document 251.

Element attribute panel component 254 displays the attributes that are defined for the current element. Panel component 254 displays the attributes according to their types and according to meta-attributes.

Figure 8:
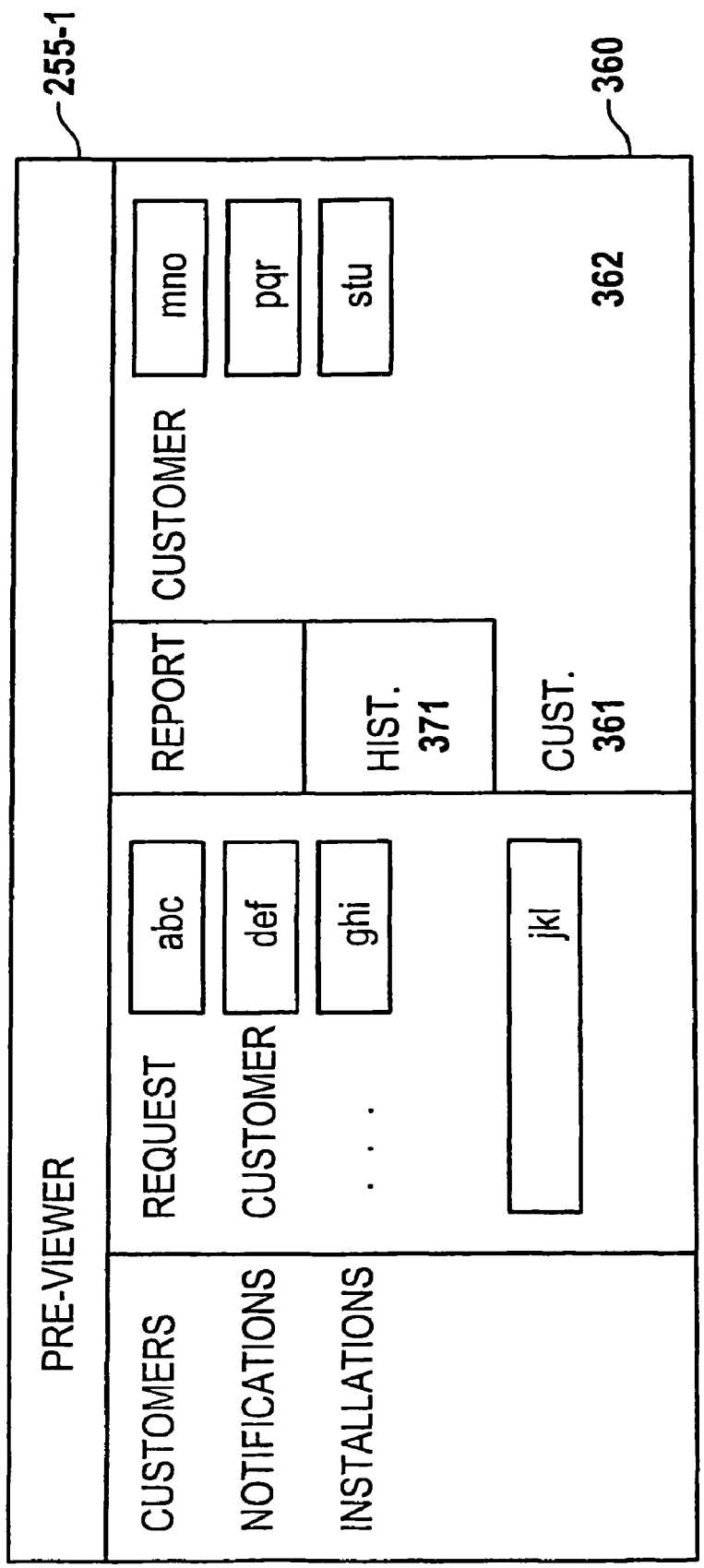
FIGS. 8-10 illustrate presentations by pre-viewers components in the workbench component of FIG. 6 for different types of computing devices.
Figure 9:
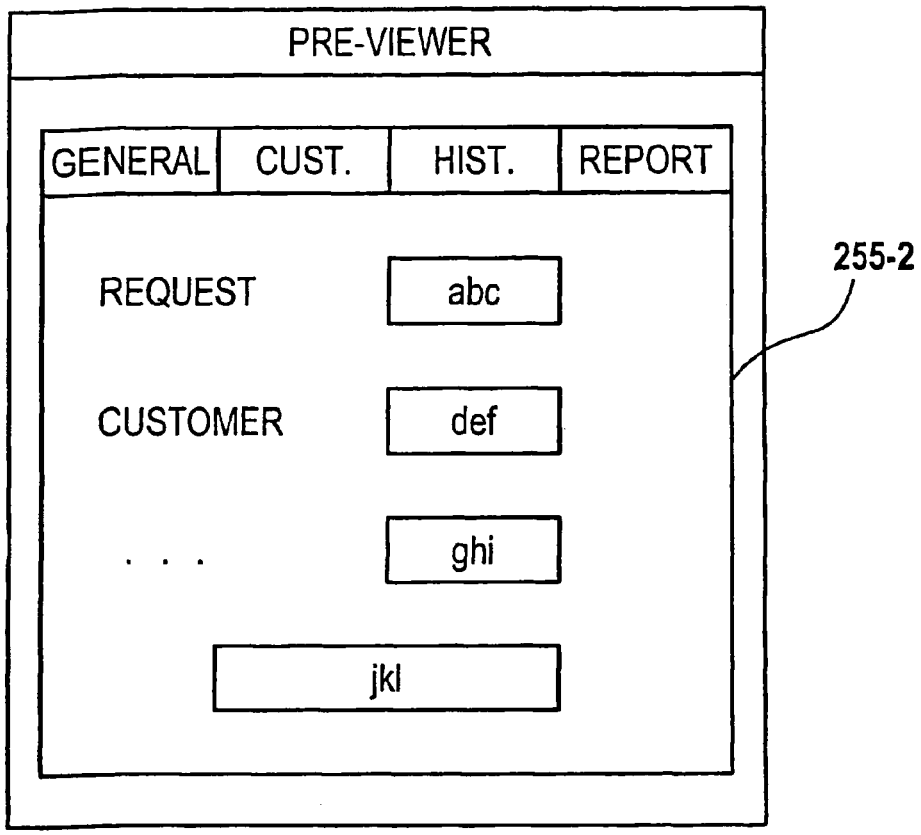
Figure 10:
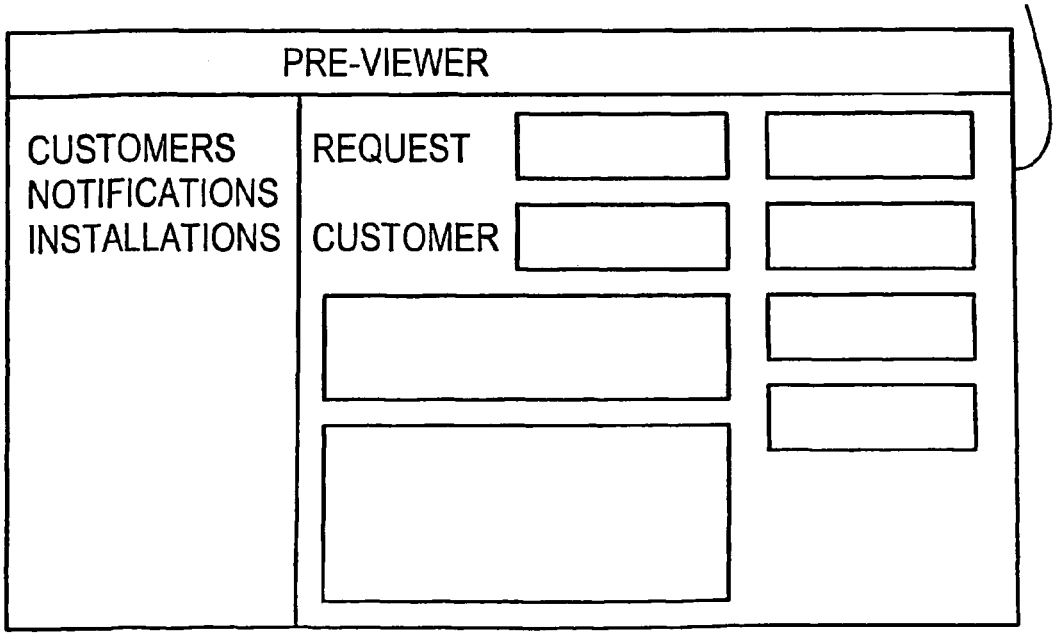

Pre-viewer components 255 present application specification document 240 in a form that approximates the presentations of document 240 by interpreter component 200 (cf. FIG. 3). In other words, each pre-viewer component 255 implements a different concrete presentation (i.e. different theme 345). Examples for presentations of pre-viewer component 255 for first, second, and third types of computing devices are illustrated in FIGS. 8, 9 and 10, respectively. The developer can open each pre-viewer component 255 separately through separate user-interfaces (not shown) for each pre-viewer component 255. Preferably, these separate user-interfaces are part of workbench component 250.

Each open pre-viewer component 255 shows (makes visible and highlights) these elements that correspond to user-interface elements. When the developer selects a representation of a user-interface element, open pre-viewer component 255 causes that element to become the current element. As a result, tree-viewers 253 and pre-viewer components 255 update their displays accordingly.

Figure 7:
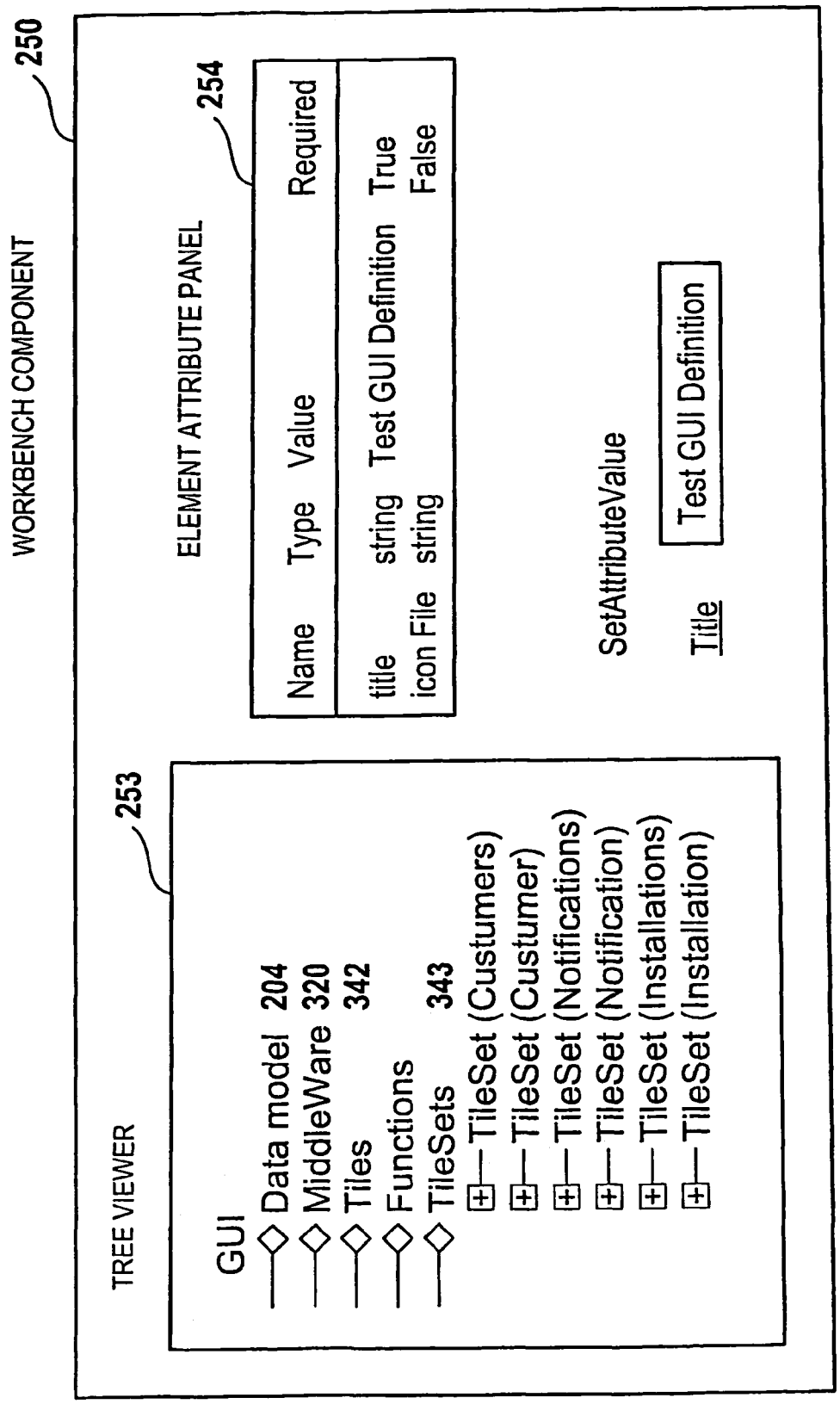
FIG. 7 illustrates a view of a computer screen showing a screen layout of the workbench component.

FIG. 7 illustrates a view of a computer screen (e.g., display 950 of computer 900) showing a screen layout of workbench component 250.

In the example of FIG. 7, tree-viewer component 253 is on the left side, and element attribute panel component 254 is on the right side. Component 253 shows graphical user interface elements like (cf. FIG. 2) data-model component 204, middleware-model component 320, tiles 342, and tile assemblies 343 (here called "tile sets").

FIGS. 8, 9 and 10 illustrate presentations of pre-viewers components 255 in workbench component 250 for first, second, and third types of computing devices by way of example. As pre-viewer 255 simulates the visual appearance of objects on the screen of the devices, the presentation of objects by pre-viewer 255 and by display 953 are equivalent. In all cases, objects are rendered with fields (e.g., 'Request', 'Customer', 'Model', 'Equipment') and content fields with texts. Depending on the type of device, different presentation patterns are identified so that each rendering is different.

FIG. 8 illustrates the presentation of pre-viewer component 255-1 for a first type of computing device (903-1). Boxes indicate content data by lowercase alphabetic triples like 'abc', 'def' and the like. Similar as in FIG. 24, on the right side, object 360 is a presentation concerning a 'customer', content field 362 of object overlaps (OVERLAP theme) content field of object 370. Title fields 361 'cust' and 371 'hist' are tabs. A presentation that relates to 'general' data is presented adjacent to the other objects 'cust' 360, 'hist' 370, and 'report' (ADJACENT theme).

FIG. 9 illustrates the presentation of pre-viewer component 255-2 for a second type of computing device (903-2). Boxes indicate content data by lowercase alphabetic triples like 'abc', 'def' and the like. The OVERLAP theme is applied for all 4 different presentation objects: 'general', 'cust', 'hist', and 'report'. Displayed in detail is 'general' only.

FIG. 10 illustrates the presentation of pre-viewer component 255-3 for a third type of computing device (903-3).

Figure 11:
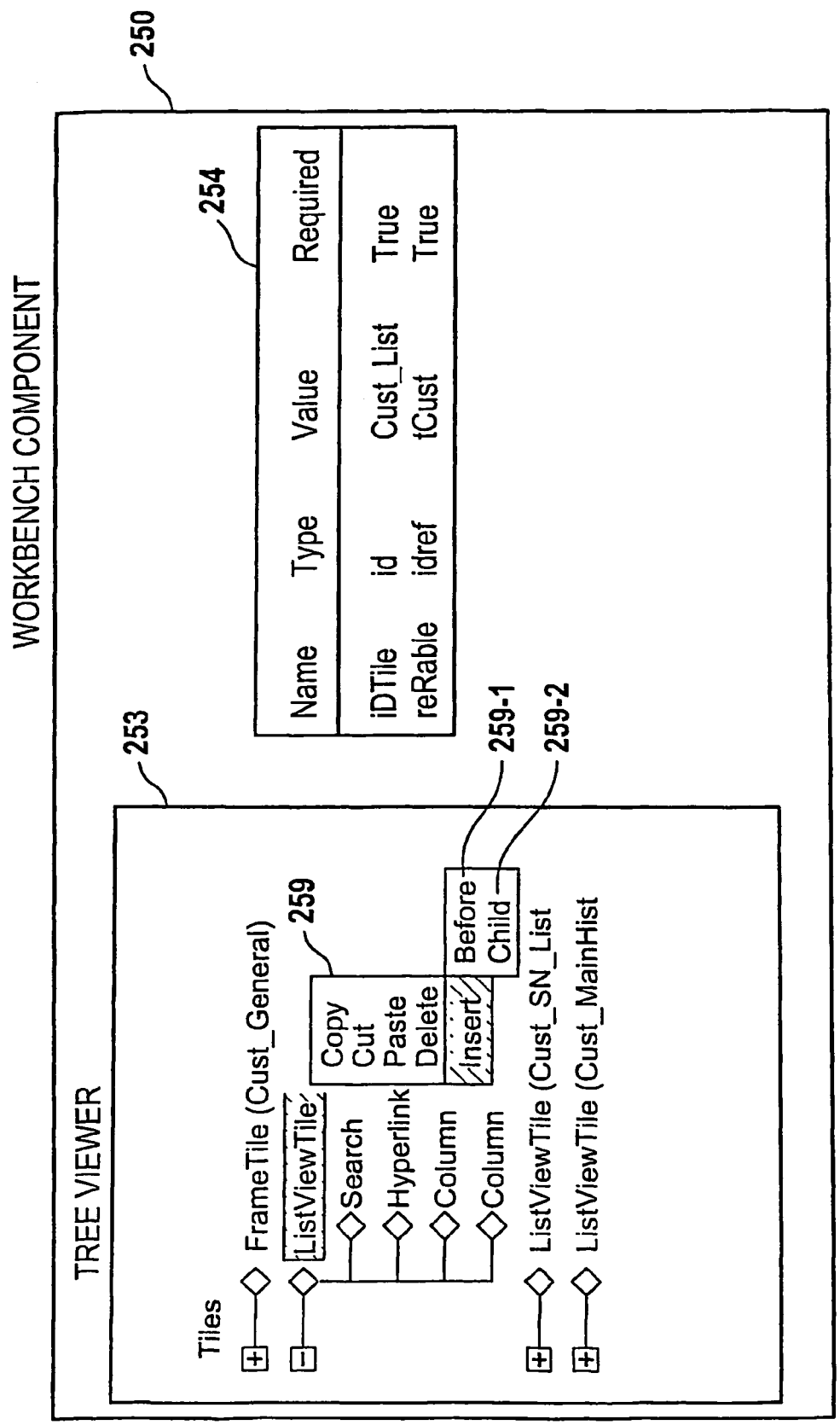
FIG. 11 illustrates a view of the workbench component during insertion of a new element instance.

FIG. 11 illustrates a view of the workbench component 250 during insertion of a new element instance. To insert a new instance of an element into the document, the developer selects an element in the tree-viewer 255 (XML-tree-viewer), and invokes pop-up menu 259. From pop-up menu 259, the developer specifies whether the element is to be added before (259-1) the selected element (at the same level), or after the selected element (not shown), or as a child (259-2).

In the example of FIG. 11, the developer has selected the element "ListViewTile" (illustrated by hatching) and has specified the insertion of a child element (259-2).

Figure 12:
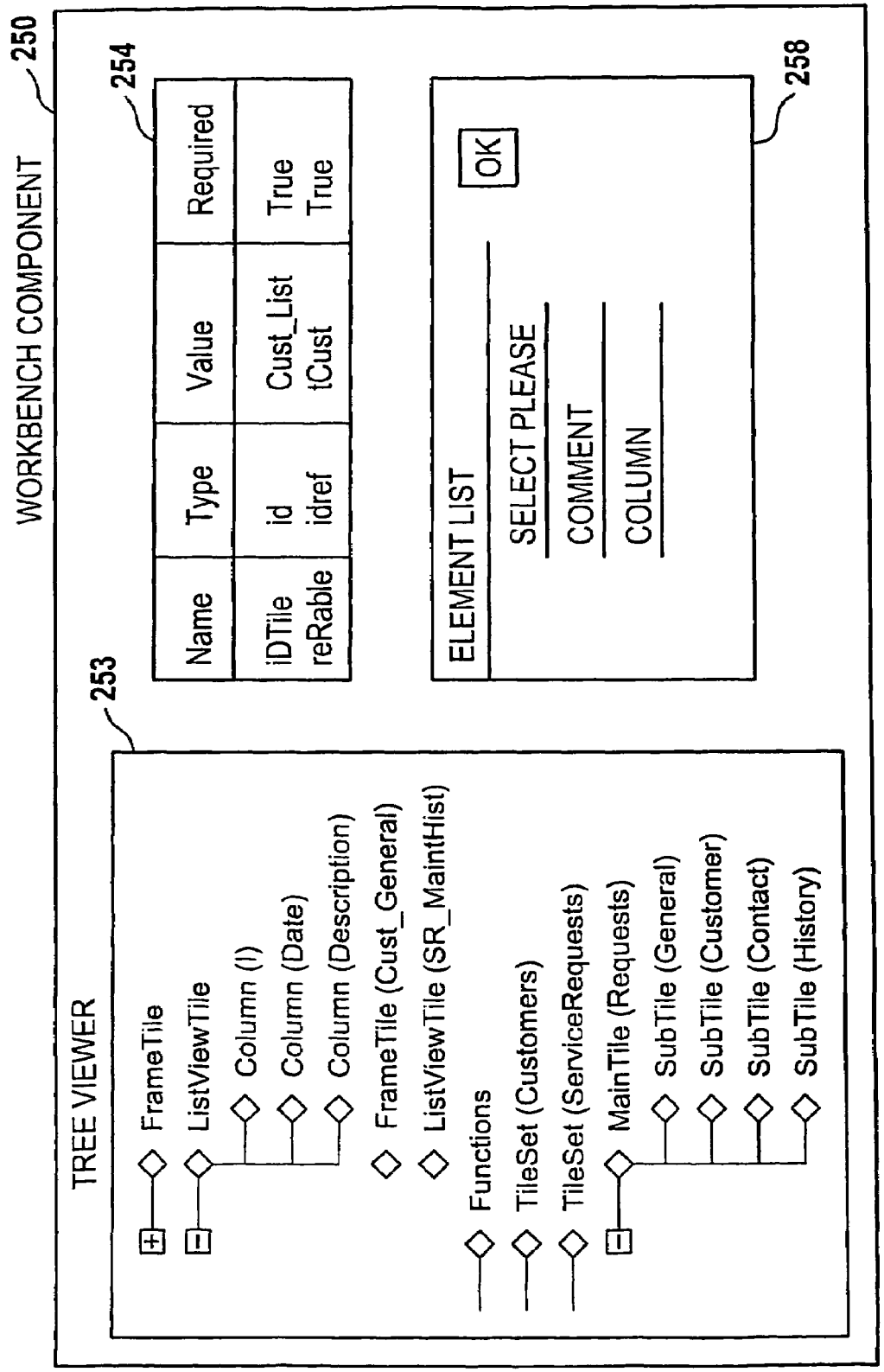
FIG. 12 illustrates a view of the workbench component during setting an attribute value.

FIG. 12 illustrates workbench component 250 during setting an attribute value. FIG. 12 illustrates the operation of workbench component 250 in continuation of FIG. 11. Tree-viewer 255 is illustrated on the left side (also illustrating main and sub tiles, cf. hierarchy pattern 299 of FIG. 21).

Workbench component 250 responds with a dialog box showing list 258 of the candidate elements at this location of the document; the candidate elements are determined automatically by inspection of the AS-language 260.

To set the value of an attribute of a particular element, the developer selects the element in tree-viewer 255 (cf. FIG. 6, FIG. 11). Workbench component 250 determines the list of all possible attributes for this element by inspection of AS-Language 260, and displays them in element attribute panel 255 of workbench component 250.

Information on the type and other meta-attributes of each attribute determines visual appearance of the attribute in attribute panel 254 (cf. FIG. 6). An attribute defined as an "enumerated type" is displayed as a dropdown list containing the set of enumerated values.

Using workbench component 250, the developer creates application specification document 240. For "prototyping", user-interface 341 is created first (enhances end-user understanding and feedback on the design). Data-model component 204 is created later. In another preferred embodiment, when data-model component 250 is known a priori, its portion of the document is created first, followed by the creation of the User-interface portion.

The prototyping embodiment is enabled by pre-viewer components 255, which are capable of approximating the presentation of the application on interpreter component 200. Pre-viewer component 255 may effect this simulation with documents that are incomplete and therefore not capable of execution by interpreter component 200 itself. Since each pre-viewer 255 realizes the simulation of a particular layout Theme, and since pre-viewers 255 can be displayed simultaneously, the developer may confirm the presentations of the application on each of devices 901/902/903 at the same time. Since the architecture of workbench component 250 also provides that any changes to the application document are broadcast to all components, the confirmation of the presentation on each device 901/902/903 can be done while the application is being created or modified.

After completing the creation of the application specification document, the developer uses the validation function of workbench component 250 to ensure that interpreter component 200 can correctly execute the document. The validation function is also driven by definition of AS-language 260.

Finally the document is transformed and encoded (see FIG. 3), and then stored ready for use by interpreter component 200.

The following describes a preferred embodiment of the application system 200/250/260 for devices 901 and 903 that are mobile devices. In other words, system 200/250/260 is a mobile data application framework (MDF) system. For convenience, the acronym "MDF" is added to reference numbers.

Application specification language (AS-language) 260-MDF corresponds to user-interface model 341.

Table 1 cites an example for AS-language 260-MDF. AS-language 260-MDF is an XML-compliant language, in other words, language definition document 230-MDF is an "XML schema". Workbench component 250-MDF provides context-sensitive guidance to the developer.

"Candidate elements" are illustrated in FIG. 12 in popup menu with list 258. The menu responds to an "insert node" command by the developer (cf. FIG. 11). Workbench component 250 determines a list of candidates by inspecting the language definition document 230-MDF.

Figure 13:
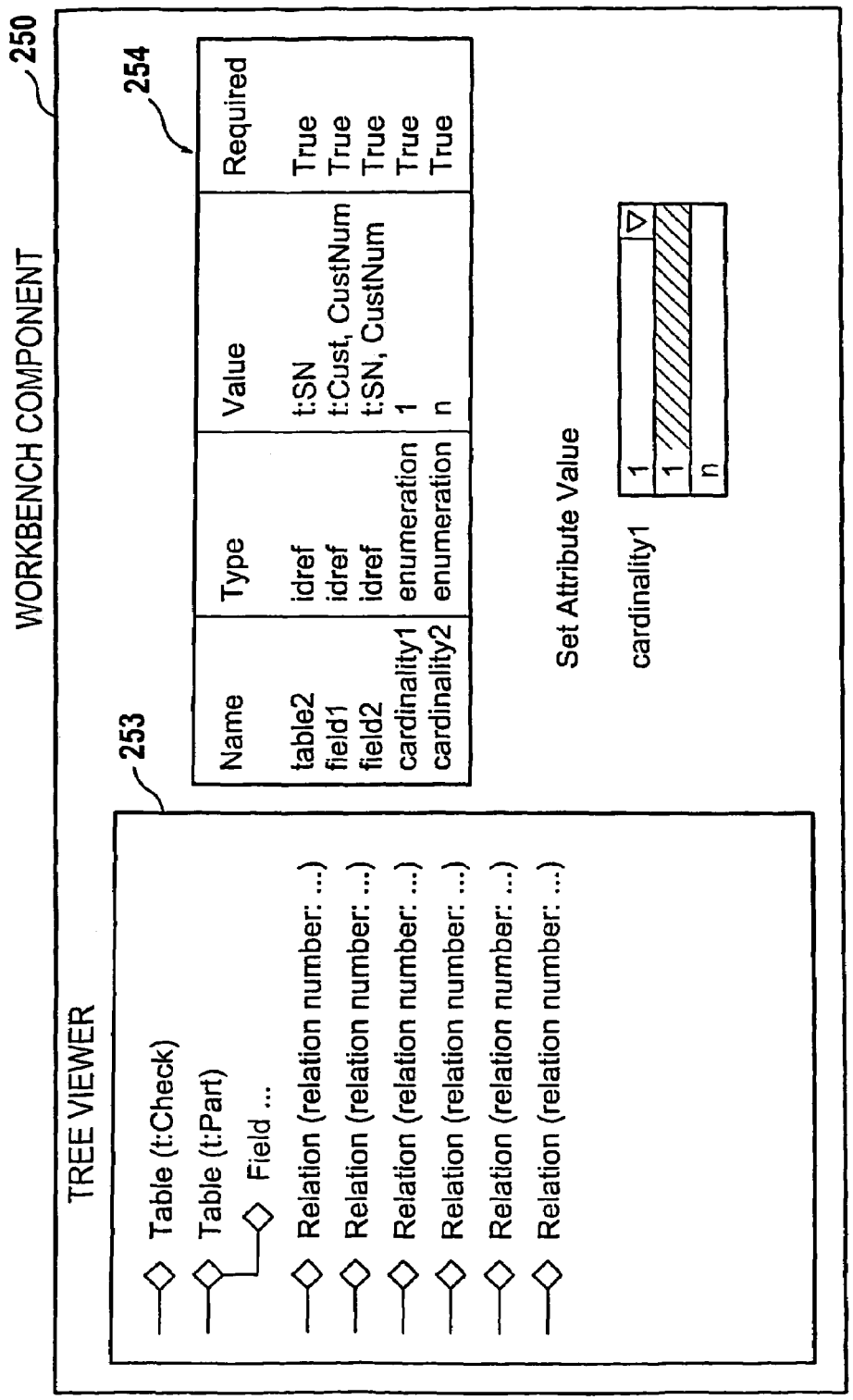
FIG. 13 illustrates a view of the workbench component with an element attribute panel.
Figure 14:
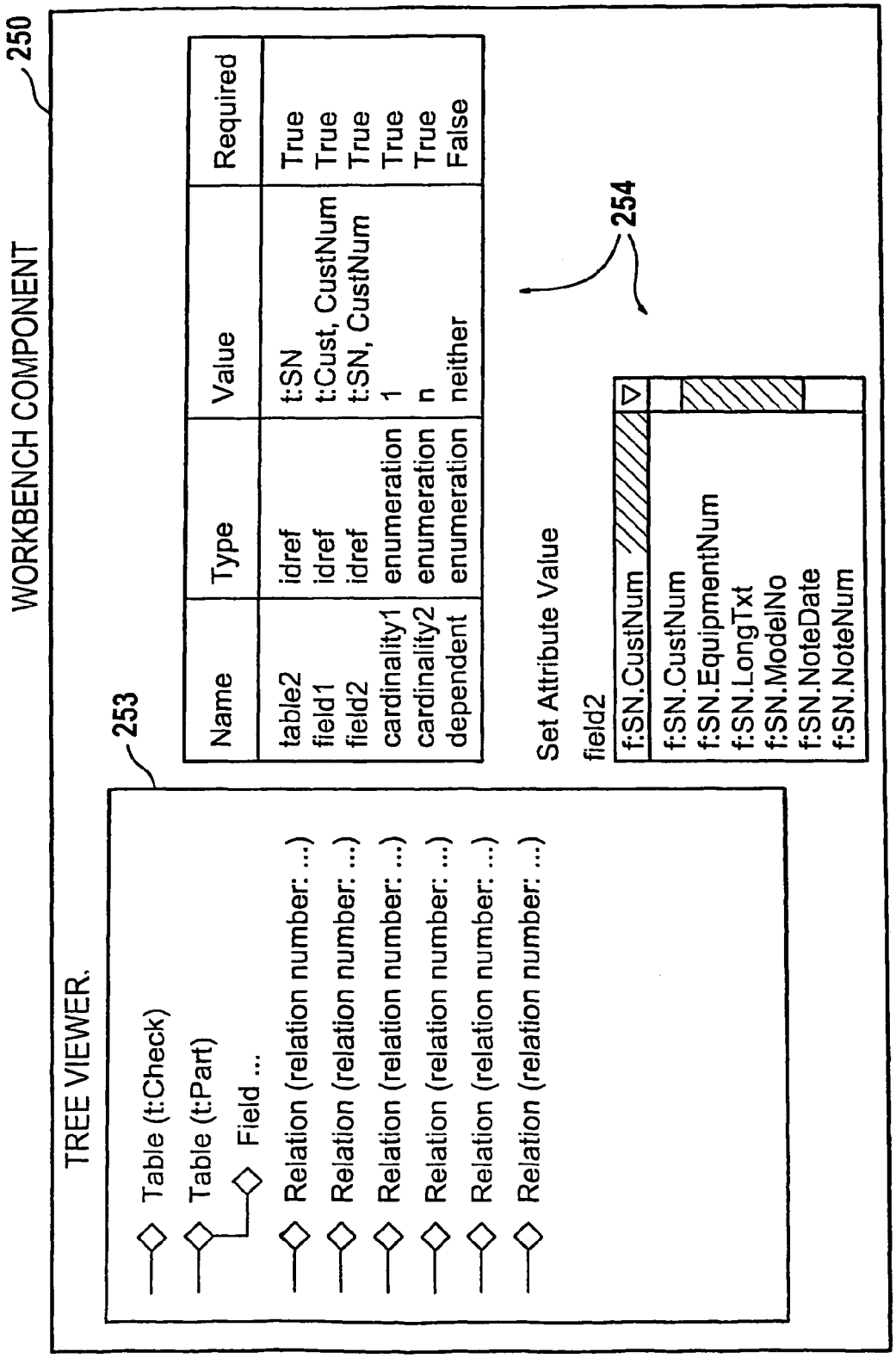
FIG. 14 illustrates further a view of the workbench component with the element attribute panel.

FIGS. 13-14 illustrate views of workbench component 250 with element attribute panel 254 (right) and tree-viewer component 253 (left).

Figure 15:
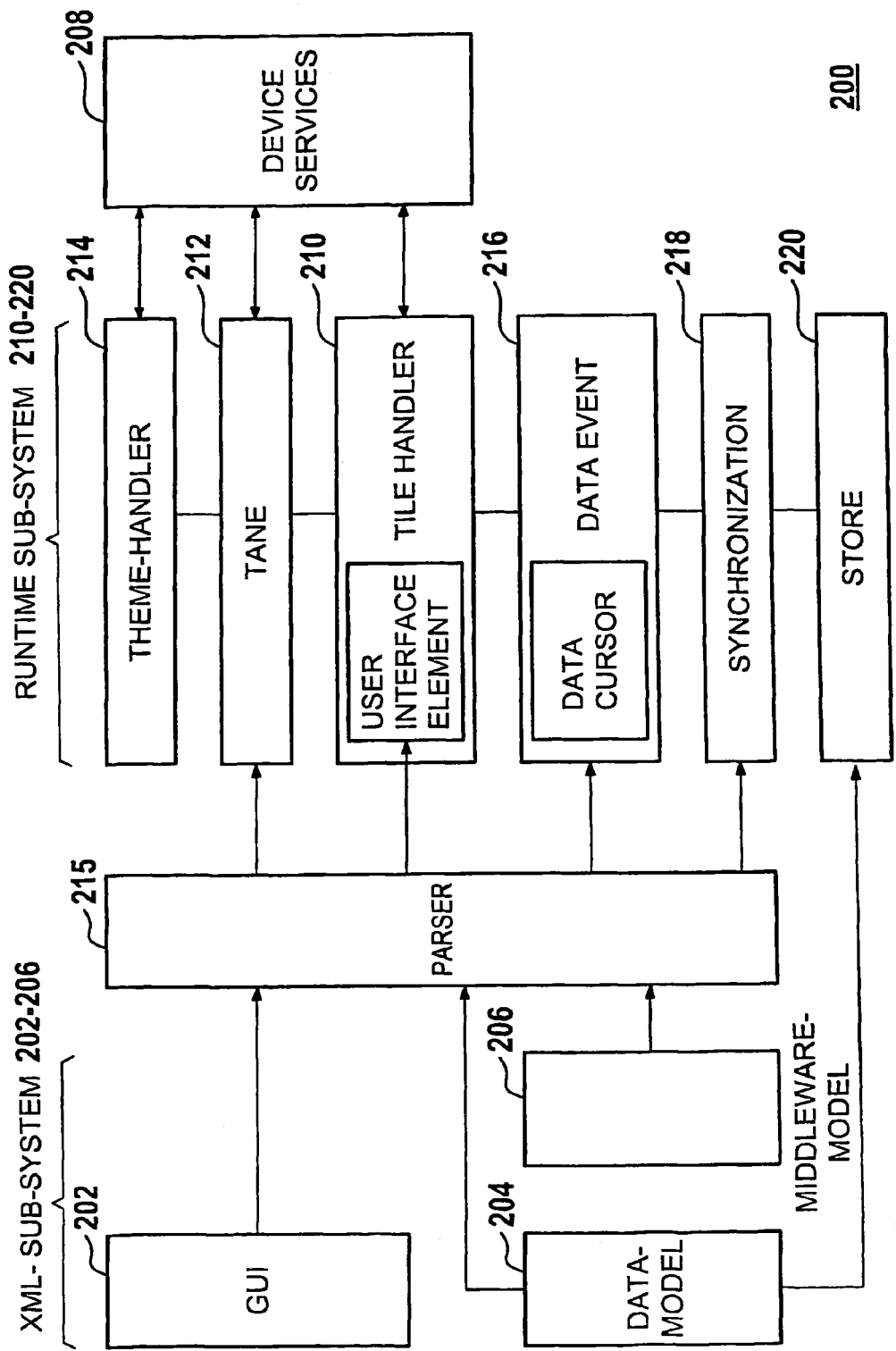
FIGS. 15-16 illustrate an interpreter component.

FIG. 15 illustrates an overview of the architecture of interpreter component 200. Illustrated from left to right, interpreter component 200 has the following sub-systems: XML sub-system 202-206, runtime sub-system 210/212/214/216/218/220, and device services 208. Parsing services component 215 (PARSER) is native to interpreter component 200.

Sub-system 202-206 for "XML Services" is of particular importance. Sub-system 202-206 provides access to the application specification. For convenience of explanation, sub-system 202-206 is illustrated separately (left side) as graphical user-interface (GUI) definition 202 ("GUI"), data-model component 204 ("DATA-MODEL"), and middleware-model components 206 ("MIDDLEWARE").

Device native user-interface services 208 ("DEVICE SERVICES", right side) are user-interface services provided by a particular computing device, these are, for example: window management (for device with graphical display), and speech synthesis (for device with voice interface).

Since services 208 can be provided by a person of skill in the art without further explanation herein, details for services 208 are not illustrated.

The other components of interpreter component 200 in FIG. 15 are collectively referred to as "runtime sub-system" 210/212/214/216/218/220, cf. dashed frame, these are: tile handler component 210 ("TILE HANDLER"), tile assembly and navigation engine component 212 ("TANE"), theme-handler component 214 ("THEME-HANDLER"), data-event services component 216 ("DATA-EVENT"), synchronization services component 218 ("SYNCHRONIZATION"), and data store services component 220 ("STORE").

Tile handler component 210 implements the collection of tile types and the collection of any user-interface elements that a tile may contain. Component 210 creates or destroys tile instances and any user-interface elements in the tile instances. Component 210 is controlled by component 212.

Tile assembly and navigation engine component 212 ("TANE component") implements the user-interface model 341. When component 212 creates an assembly, component 212 creates inter-tile relations by setting up a data-event propagation network. The Network is formed by user-interface elements and data cursors.

Theme-handler component 214 maps user-interface model 340 and TANE component 212 to a concrete user-interface. Theme-handler component 214 acts as a bridge between TANE component 212 on one side and the user on the other side. When requested by the theme, theme-handler component 214 shows or hides individual tiles (or equivalents in non-graphical user-interfaces).

Data-event services component 216 ties individual tiles, user-interface elements, and synchronization services together. Component 216 has data cursor objects to implement the notion of a sequence of objects and of a distinguished position in the sequence. The distinguished position is referred to as "cursor"; and the object at the cursor is referred to as the "current object". Objects in data-event services component 216 propagate events that relate to the data-store among the data cursors and user-interface elements.

Synchronization services component 218 is responsible for the synchronization of the data-stores between device 901/902/903 and server computer 900 (remote server). Component 218 intercepts changes to the data-store originating from tile handler component 210, records and assembles them into messages that are eventually sent to server computer 900. In the other direction, synchronization services component 218 receives changes from server computer 900 in the form of messages from the server requesting the changes, and applies them to data store component 220; the receiving action is completed by issuing data-events into data-event services component 216 corresponding to the changes.

Data store services component 220 is the data-storage of computing device 901/902/903. Preferably, component 220 is a relational database management system. For example, component 220 is a database commercially available in the Microsoft Windows CE operating system.

Application document services component (not illustrated in FIG. 15) is responsible for reading interpreter-readable document 241 from storage 242 (encoded version of application specification document 240) and presents documents 241 to the other components.

Figure 16:
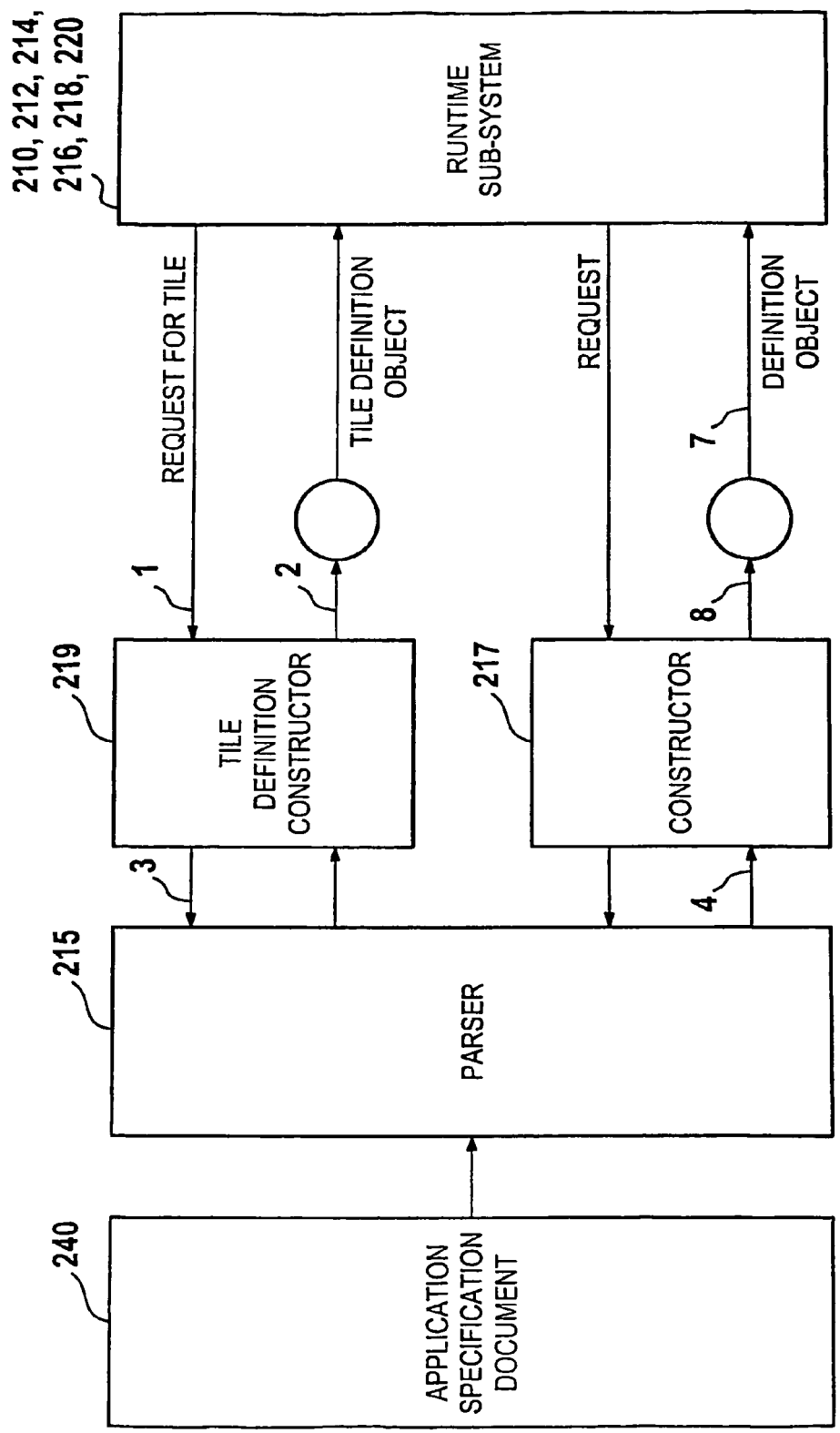

FIG. 16 illustrates a detail of the operation of a parsing services component 215 of the interpreter component 200. FIG. 16 illustrates the interpretation of application fragments by the application document services component. Steps are illustrated by arrows. As in FIG. 16, runtime sub-system 210/212/214/216/218/220 (cf. FIG. 15) requests (arrow 1) the specification of a tile definition, and receives (arrow 2) an object representation (circle symbol) of the tile definition in reply from constructor 219. Parser services component 215 (cf. FIG. 15) (a) reads (arrow 3) the tile definition and (b) simultaneously issues (arrow 4) parser events to constructor object 217. Constructor object 217 is specific to the element at the root of the fragment, (i.e. the tile element). Constructor object creates an object representation (circle symbol at arrow 8) of the tile definition in memory 921/922 of device 901/902/903, and delivers (arrow 7) this object representation back to sub-system 210/212/214/216/218/220 of interpreter component 200.

In application system 200/250/260, interpreter component 200 is optionally specialized for special environments or system configurations. In the following, first and second embodiment of interpreter component 200 are explained.

In both embodiments, the server-side interpreter component is implemented on mainly on server computer 900 and the presentation layer is implemented on computing device 901/902/903. Synchronization services component 218 (cf. FIG. 15) is not required.

In the first embodiment, device 901 is the portable phone with micro-browser. Theme 345 (cf. FIG. 2) is a micro-browser theme (cf. 342-1). In cooperation with interpreter component 200, the micro-browser of device 901 realizes a wireless markup language (WAP) presentation. Details are explained in connection with FIG. 20.

In the second embodiment, device 902 is the conventional phone. Theme 345 (cf. FIG. 2) is a voice theme (cf. 345-2) in user-interface 340 that supports voice-recognition and voice-synthesis. The presentation layer here is the audio input and audio output on the telephone.

FIGS. 17-19 illustrate series of view of computer screens of computing devices 903-1, 903-2, and 903-3 that are handheld personal computers, such as personal digital assistants (PDA). Devices 903-1, 903-2, and 903-3 are devices of first, second, and third types, respectively. In other words, a single MDF application definition is shown with three graphical user-interface themes: half-VGA handheld personal computer 903-1, Palm personal computer 903-2, and VGA Handheld personal computer 903-3, applicable to Windows CE devices with corresponding screen sizes.

FIG. 17 illustrates a series of views of computer screen 953-1 of computing device 903-1 of the first type. In the example of FIG. 17, the device of the first type is handheld personal computer 901-1 with half-VGA size display (240 pixels high by 640 pixels wide). The mapping of the generic user-interface model to theme 345 is illustrated as a sequence of events in FIG. 17A, FIG. 17B, FIG. 17C, and FIG. 17D:

As in FIG. 17A, titles of the top-level tile set assemblies (e.g., 'customers', 'notifications', 'installations') are displayed as navigation bar 401 on the upper-left.

As in FIG. 17B, navigation stack 402 is exposed as a list on the lower-left ('customers'). Clicking on an entry in stack 402 removes from the stack all entries deeper than the selected entry. Additionally, a backward-pointing arrow (similar to arrow 407 in FIG. 18) removes the element at the top of stack 402.

Figure 17C:
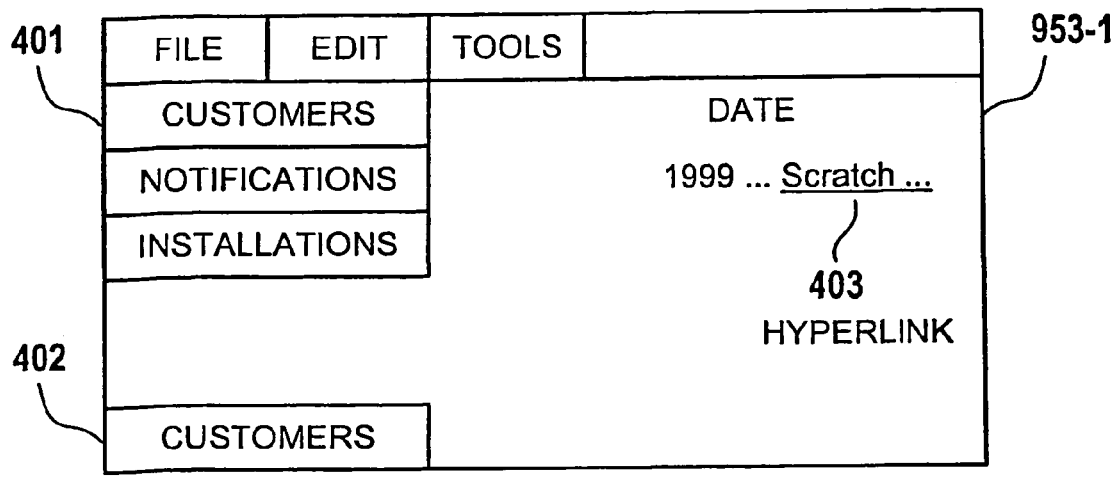
Figure 17D:
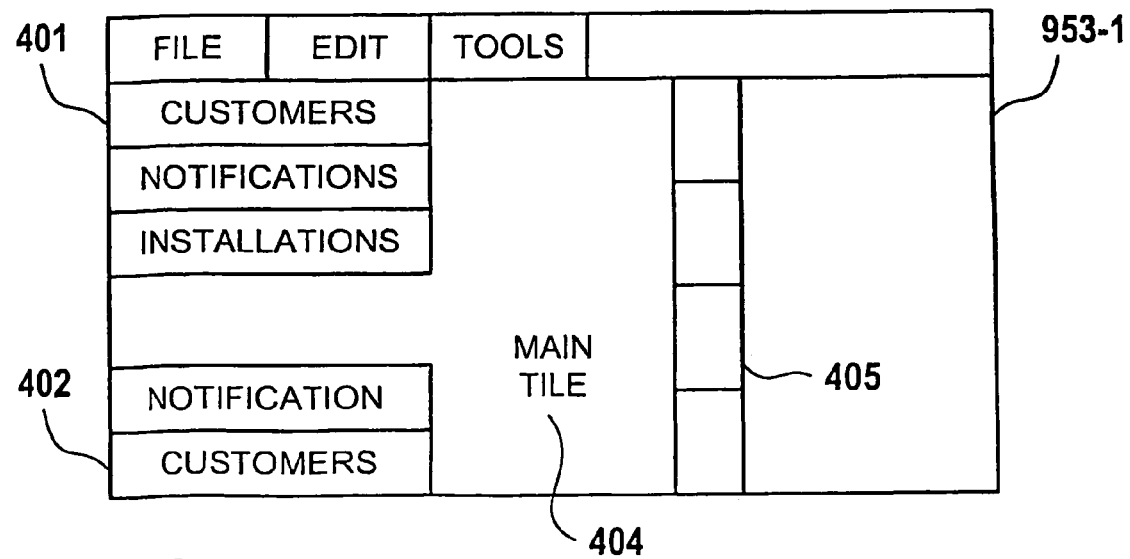
Figure 18A:
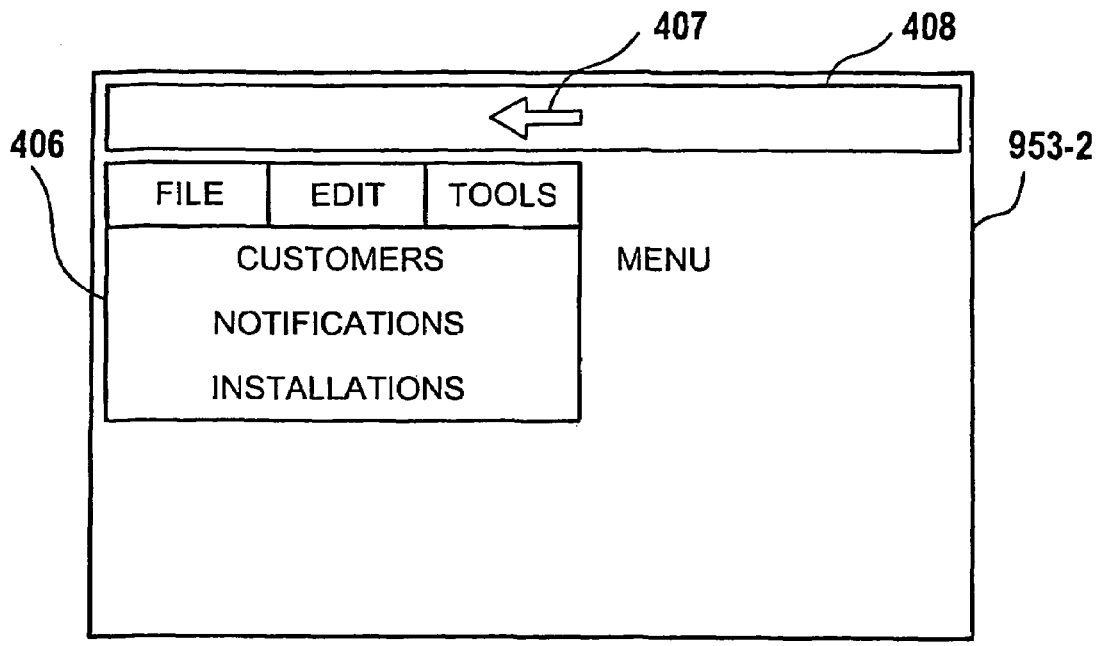
Figure 18B:
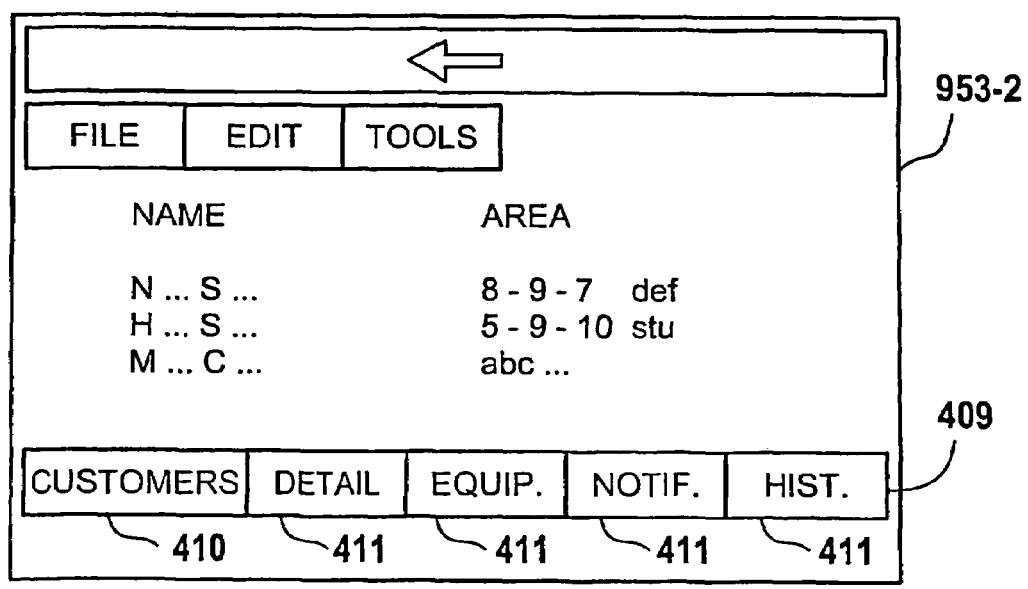
Figure 18C:
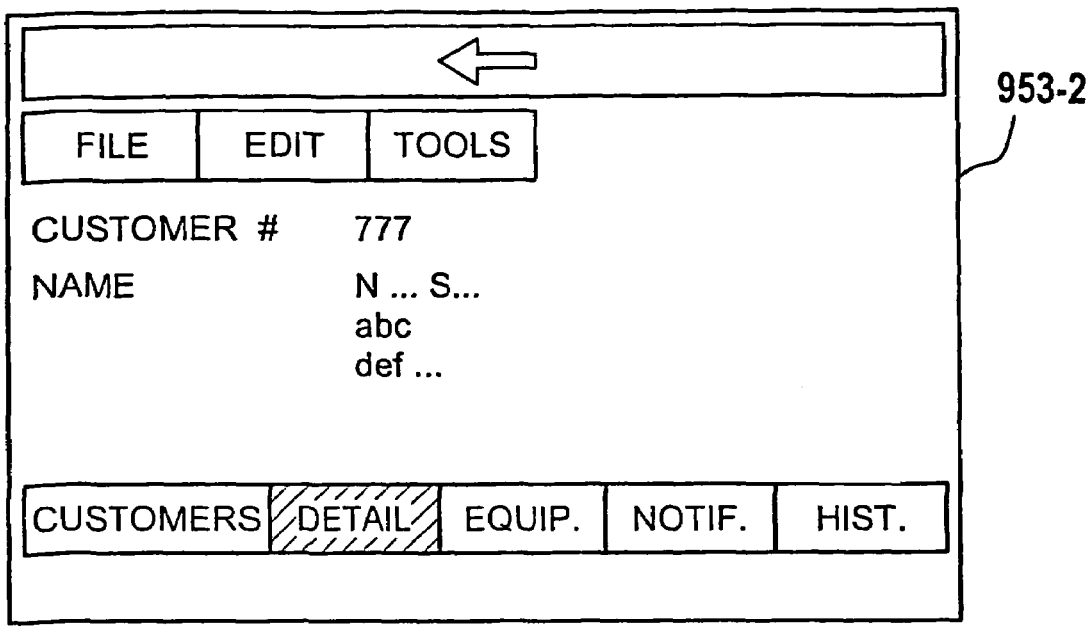
Figure 18D:
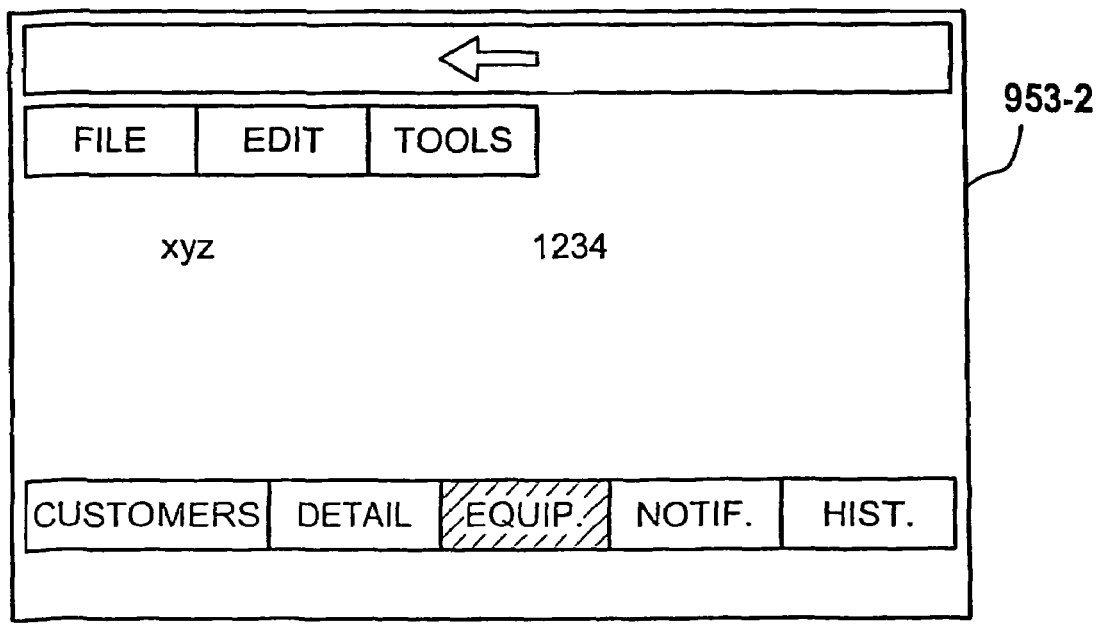
Figure 18E:
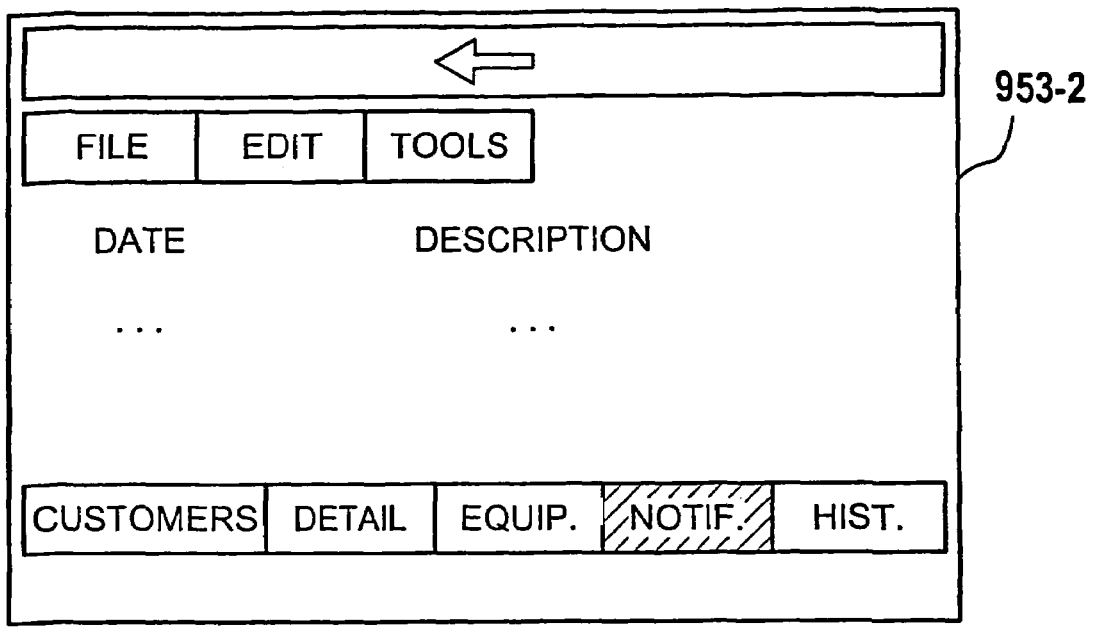
Figure 18F:
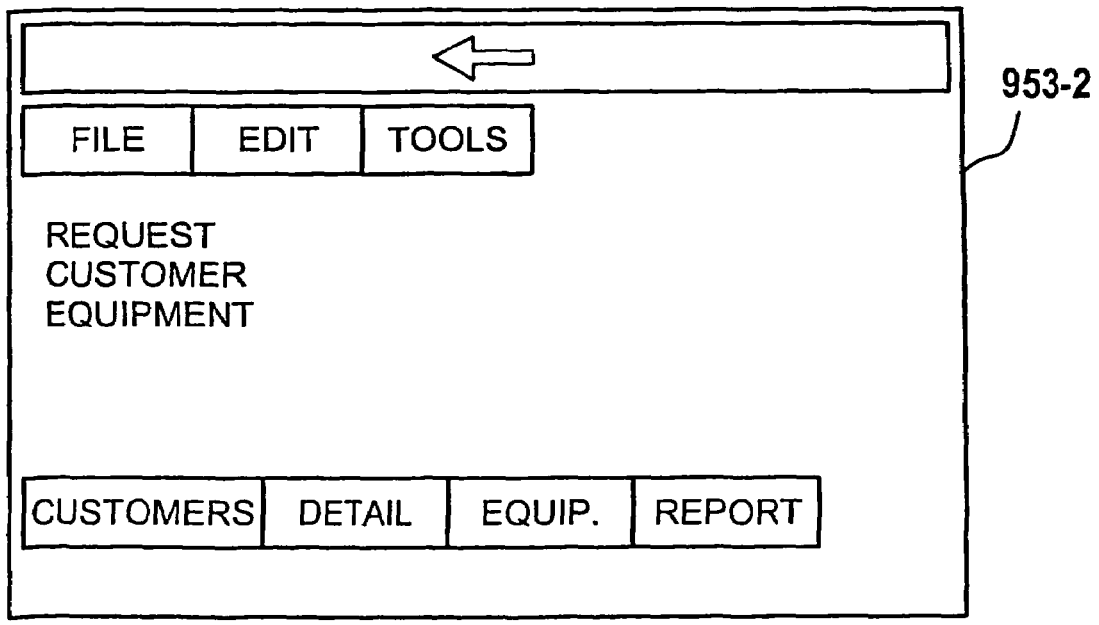

As in FIG. 17C and FIG. 17D, list view tiles (and frame tile textbox elements, not shown) optionally have associated hyperlinks 403. Clicking on hyperlink 403 (e.g., 'scratches one the surface') creates a new tile set (e.g., notification) that is added to the top of navigation stack 402 (FIG. 17D). The old current tile set is hidden and a new current tile set is displayed. Main tile 404 of the current tile set is shown immediately, for example, in the middle window right to navigation bar 401. As in FIG. 17D, sub tiles 405 are shown in a tab strip at the right.

FIG. 18 illustrates a series of views of computer screen 953-2 of computing device 903-2 of the second type. In the example of FIG. 18, the device of the second type is handheld personal computer 903-2, such as a Palm personal computer (320 pixels high by 240 pixels wide). In contrast to personal computer 903-1 of the first type (FIG. 17, handheld personal theme), that uses navigation bar 401; computing device 903-2 of the second type accesses the list of top-level tile sets through menu 406 (FIG. 18A).

A navigation stack is not exposed as a visible control although as in handheld personal computer 903-1 (Half-VGA) it can be manipulated via the back arrow 407 on toolbar 408. The main tile of the current tile assembly is shown as the leftmost tab 410 in tab-strip 409, and sub-tiles 411 ('detail', 'equipment', etc.) follow to the right.

FIG. 19 illustrates a series of views of computer screen 953-3 of a computing device 953-3 of the third type. In the example of FIG. 19, the device of a third type is handheld personal computer 903-3 having a full VGA-size display (640 pixels high by 480 pixels wide).

The third type moves away from using tab-strip 409 to organize the tiles, and instead displays the tiles simultaneously in one or more fixed locations 412-415 (or "slots") on the screen.

In detail, the mapping of the user-interface model to third type theme 345-3 is similar to that of first type theme (345-1, half-VGA). The screen is split into 4 areas 412-415 (slots).

An additional attribute, the target-frame attribute, is defined on the main tile and sub tile of each tile assembly and specifies which slots 412, 413, 414 or 415 to occupy on screen 953-3. A single tile can occupy one or more slots.

The target frame attribute can be empty; in that case, the tiles are shown in minimized form to be maximized on request by the user.

The number of tiles per slot as well as the number of slots per tile may vary. For example, the columns of a 'list view' tile have an associated importance attribute that is used to determine which columns to suppress in order to fit the available space. The illustration of FIG. 19B shows the upper tile 'customer list' 417 reduced to half width (cf. customer list 416 in FIG. 19A, slot 415 only) in response to co-opting of slot 412 allocation by a tile 'customer detail' 418.

Figure 20A:
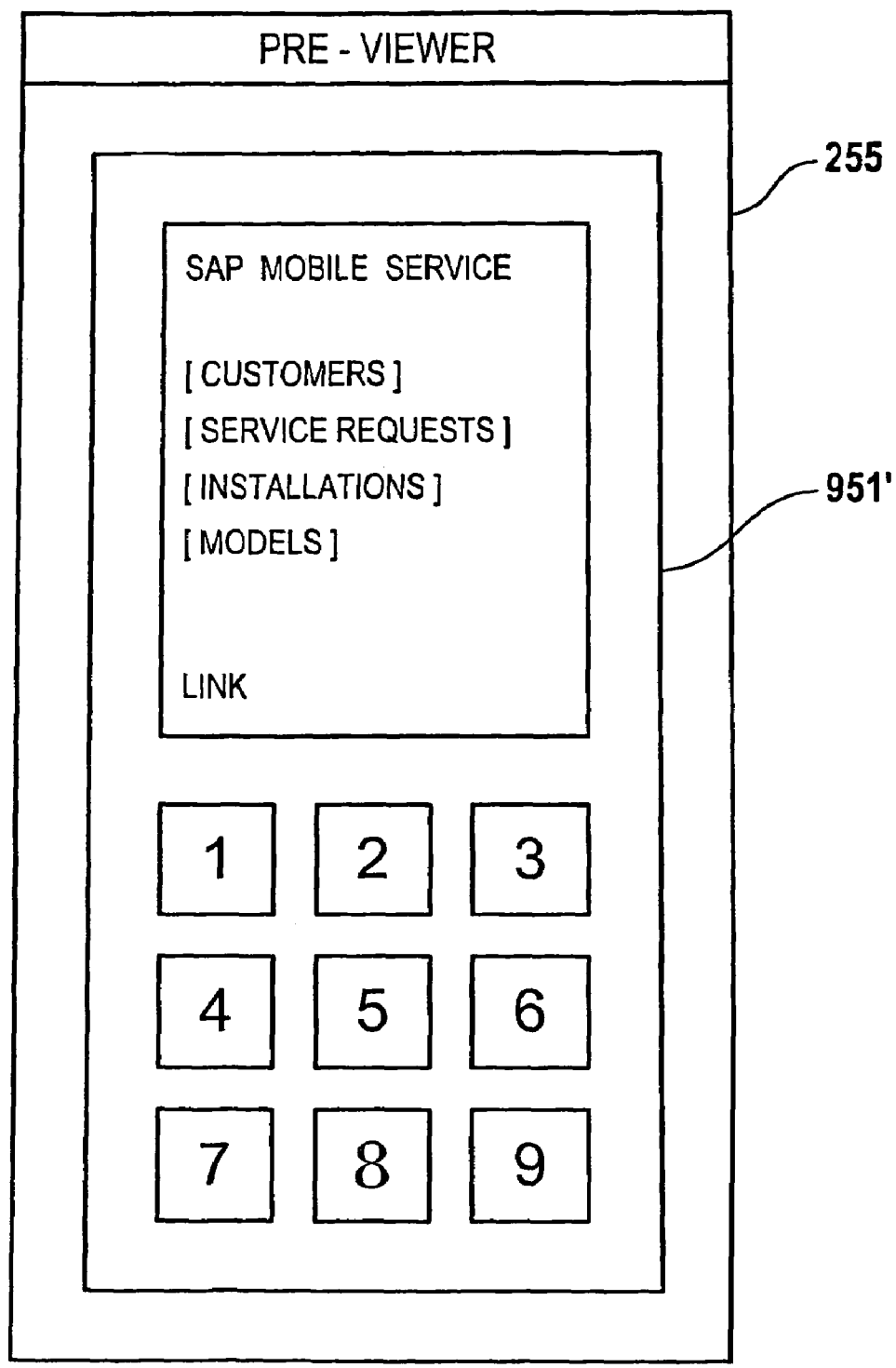
Figure 20B:
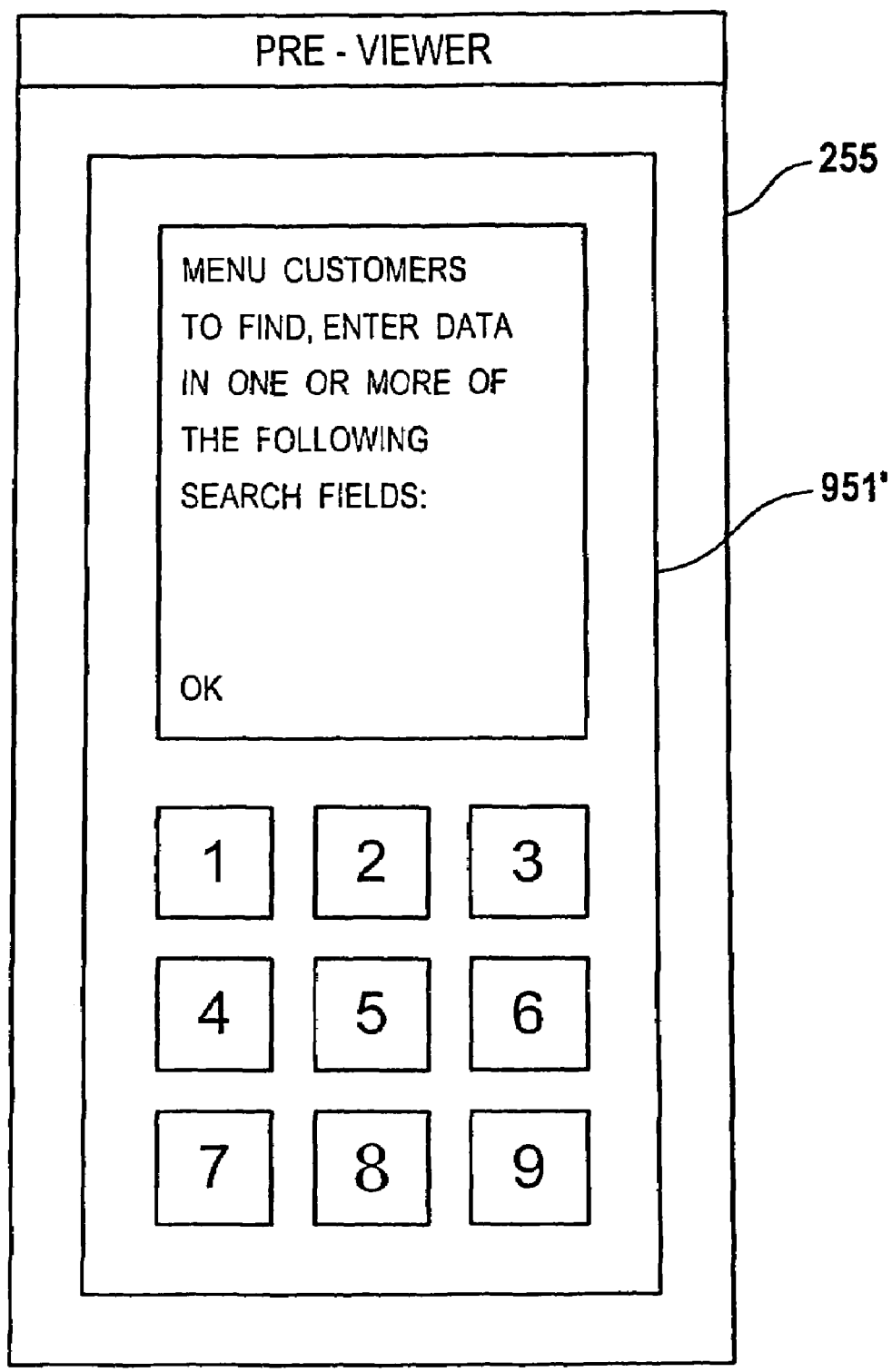
Figure 20C:
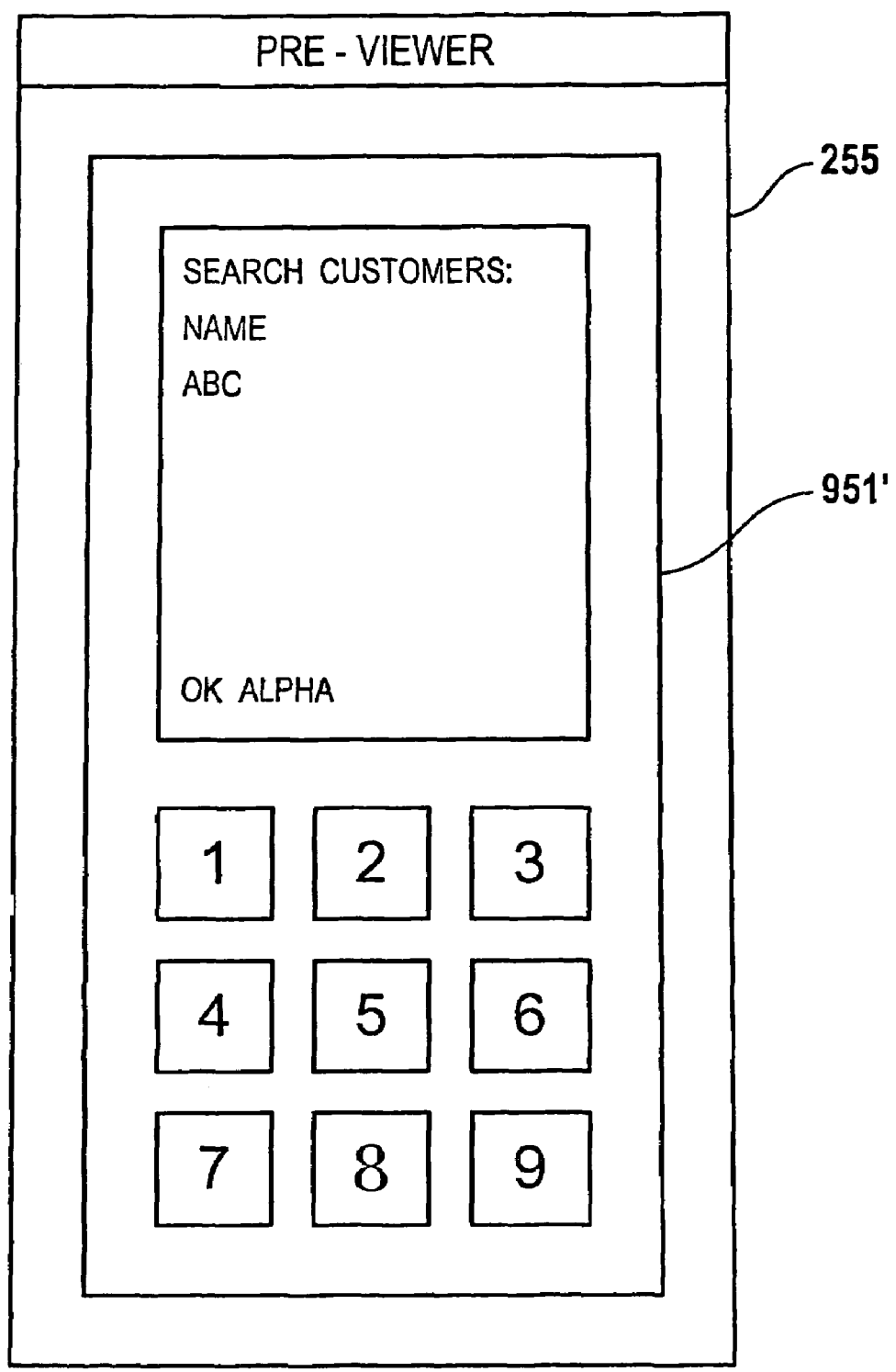

FIG. 20ABC is a series of views of a simulated display of wireless telephone 901 with micro-browser illustrating the server-side interpreter components WAP-theme 945-1. The view appear as in pre-viewer 255 that presents simulation 951' of display 951 in device 901. Preferably, interpreter component 200 is located on a server computer (server-side interpreter 200-2, cf. FIG. 5).

Figure 21:
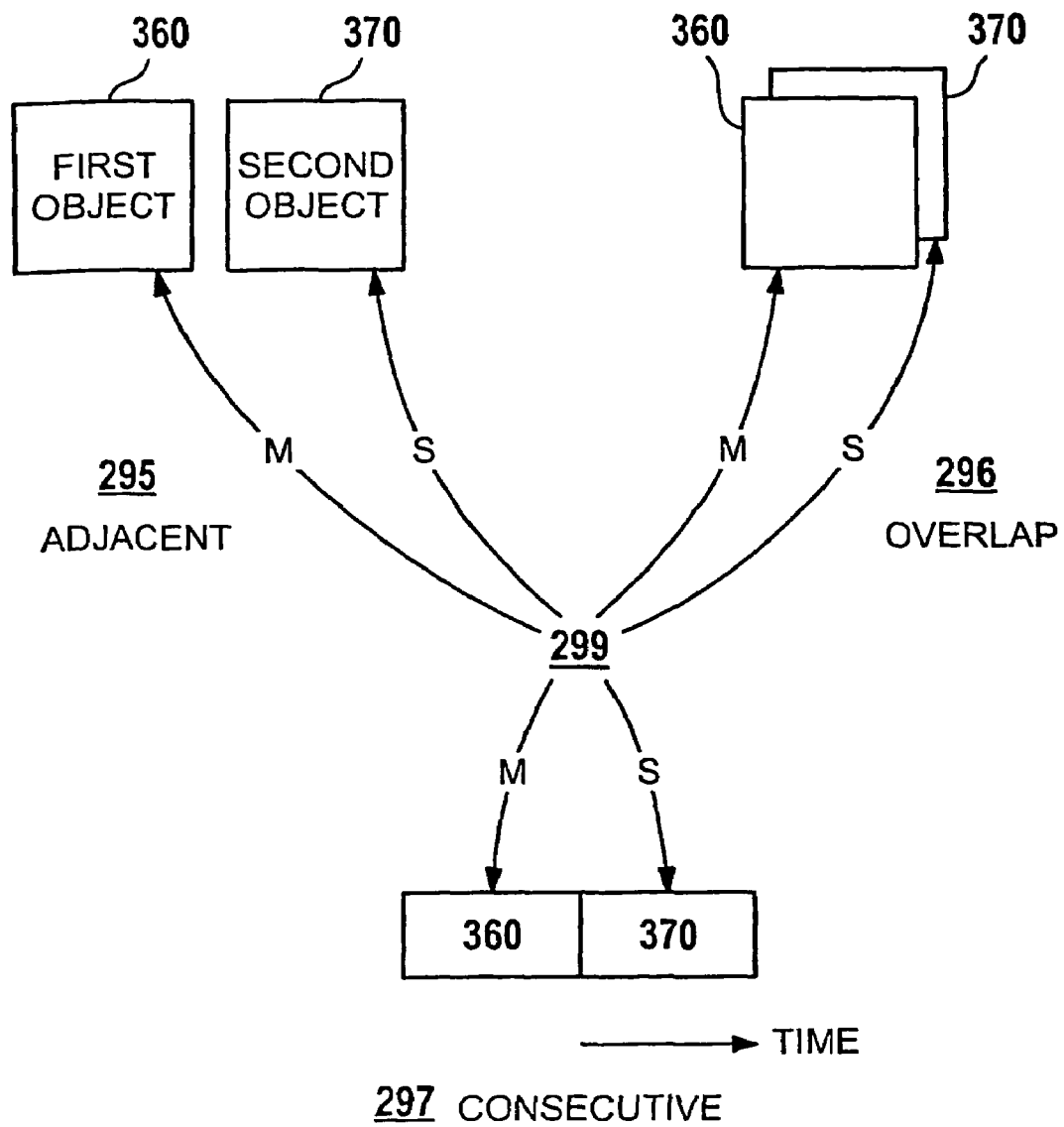
FIG. 21 illustrates predefined patterns by symbols: presentation patterns and a hierarchy pattern.

FIG. 21 illustrates predefined patterns by symbols. Presentation pattern 295, 296, 297 define relations between at least two objects 360 and 370 to each other. The examples of FIG. 21 are intended to be non-limiting; persons of skill in the art are able to define further patterns without departing from the scope of the present invention. Adding further objects is possible. FIG. 21 also illustrates the patterns by graphical symbols. Pattern 295 indicates visual rendering objects 360 and 370 on a screen, wherein objects 360 and 370 are ADJACENT. Pattern 296 indicates visual rendering objects 360 and 370 on a screen, wherein objects 360 and 370 OVERLAP.

Pattern 297 indicates aurally rendering objects 360 and 370 on by a speaker (part of user-interface 963), wherein objects 360 and 370 are consecutively presented.

Hierarchy pattern 299 is optionally provided. In the example of FIG. 21, object 360 is the main object ("M") and object 370 is the sub-coordinate object ("S"). Plain lines with the acronyms "M" and "S" indicate this.

Figure 22:
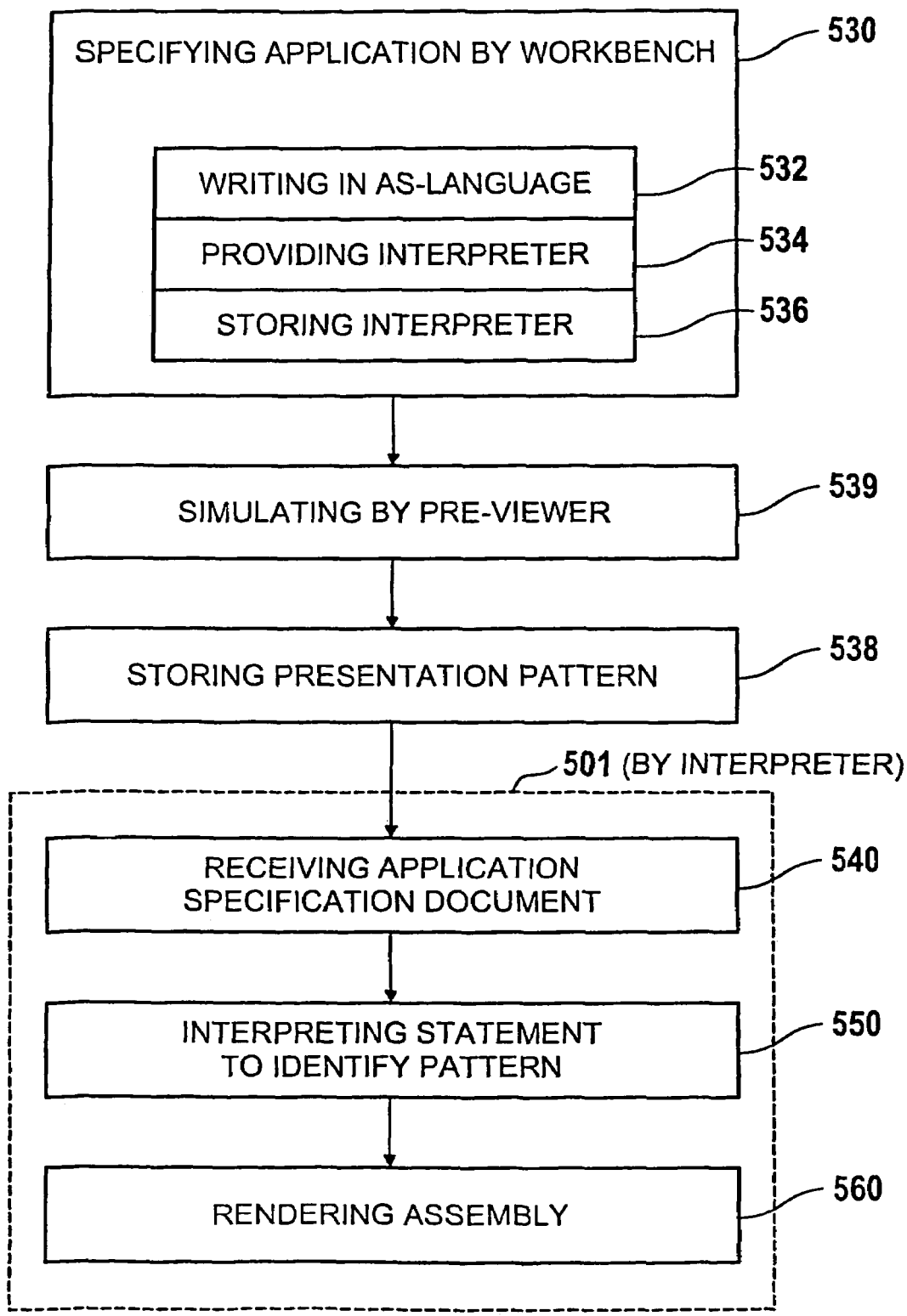
FIG. 22 illustrates a simplified flow chart diagram of a method for rendering a first object and a second object on a user-interface of the device.

FIG. 22 illustrates a simplified flow chart diagram of method 500 for rendering a first object (360, cf. FIGS. 23, 22) and a second object (370, cf. FIGS. 23, 24) on user-interface 963 of device 903. As mentioned, device 903 is either of a first type (device 953-1) or of a second type (device 953-2). The first and second objects presents data of a business application. Method 500 comprises the following steps:

540 receiving application specification document 240 (with statement 245) by device 903;
550 interpreting statement 245 to identify presentation pattern 295/296; and
560 rendering assembly 360/370.

In step receiving 540, application specification document 240 is received with statement 245 having an indication to render first object 360 and second object 370 in assembly 360/370. In step interpreting 550, presentation pattern 295/296 for assembly 360/370 is identified from predefined first presentation pattern 295 and second presentation pattern 296 according to the type 903-1/903-2 of the device 903 (i.e. pattern 295 for type 903-1, pattern 296 for type 903-2). In step rendering 560, assembly 360/370 of first object 360 and second object 370 is rendered on user-interface 963 according to presentation pattern 295/296 identified in step interpreting 550.

As indicated by dashed frame 501, steps 540, 550 and 560 are performed by interpreter component 200 in device 901/902/902. Optional further steps (preferably, performed by computer 900) are explained in the following.

Preferably, prior to step receiving step 540, further steps are:

530 specifying the application by workbench 250 in development computer 900; and
539 simulating the application by pre-viewer component 255 of workbench 250.

Preferably, in step 560, rendering, first object 360 and second object 370 are rendered according to presentation pattern 295/296 and to predefined hierarchy pattern 299 (cf. FIG. 21).

Preferably, in rendering step 560, first object 360 and second object 370 are rendered not only according to presentation pattern 295/296, but also according to predefined hierarchy pattern 299.

Preferably, specifying step 530 comprises:

532 writing the application in an application specification language (AS-language);
534 providing interpreter 200 specific for the application specification language; and
536 storing interpreter 200 in device 903.

Preferably, method 500 further comprises: storing 538 predefined presentation patterns 295/296 by interpreter 200 (cf. themes 345 in FIG. 5). Step 538 is performed prior to step 540, for example, after step 539. Preferably, presentation pattern 295/296 is a display pattern, wherein the objects are rendered to user-interface 563 being screen 953, and wherein presentation pattern 295/296 is identified according to the size (e.g., width) of screen 953. Optionally, in rendering step 560, presentation pattern 297 is an audio pattern.

FIGS. 23 and 24 help to illustrate method 500 by a simplified first example. In the example, a business application renders two objects in an assembly on a screen. Despite the different appearance of the two objects on the different screens, rendering statement 245 in application specification document 240 is the same. Interpreter components 200 in the different devices 903 select the suitable rendering form (i.e., presentation pattern). It is not important whether each device has its own interpreter or not. Each device can have its own interpreter component 200: device 903-1 has interpreter 200-1, and device 903-2 has interpreter 200-2; or all devices have the same interpreter 200. In both cases it is sufficient that interpreter 200 identifies the predetermined presentation patter (i.e. theme) and that theme handler 214 can use the pattern.

FIGS. 23 and 24 illustrate simplified screen 953 of device 903 in different type configurations. Devices 903-1 and 903-2 are of first and second types, respectively, and also screens 953-1 and 953-2 are of first and second types, respectively.

Both screens 953-1 and 953-2 each render first object 360 and second object 370 in assembly 360/370. Objects 360 and 370 each comprise title fields 361 and 371 and content fields 362 and 372. According to the invention, location and shape of objects 360/370 are modified; the content of content fields 362/372 is determined by the application. In other words, what happens inside content fields 362/372 (e.g., display of business data) is independent from what happens outside.

For convenience of further explanation, Cartesian coordinate system (X, Y) is illustrated with the origin in the left bottom.

For simplicity of further explanation, screens 953-1 and 953-2 are distinguished by the screen widths only (X-dimension): screen 953-1 in FIG. 23 is "large", and screen 953-2 in FIG. 24 is "small". The width of content fields 362/372 is equal for both screens. The Y-dimension is also important and considered in the way as the X-dimension.

FIG. 23 illustrates screen 953-1 of device 903-1 (first type). Screen 953-1 has a screen width of 640 pixels (cf. explanation of FIG. 17). Screen 953-1 is associated with the theme ADJACENT. First object 360 has title field 361 and content field 362. Similar, second object 370 has title field 371 and content field 372. As displayed on screen 953-1, title fields 361/371 and content fields 362/372 have the same field width, for example, 300 pixels. Screen 953-1 renders objects 360 and 370 adjacent to each other. This is possible because the screen width is larger that the sum of the field widths, that is 640 pixel>300 pixel+300 pixel.

FIG. 24 illustrates screen 953-2 of device 903-2 (second type). Screen 953-2 has a width of 240 pixels (cf. explanation of FIG. 18). Screen 953-2 is associated with the theme OVERLAP. Similar as in FIG. 23, first object 360 has title field 361 and content field 362 and second object 370 has title field 371 and content field 372. However, content field 362 overlaps content field 372; in other words, content field 362 hides content field 372. Title fields 361 and 371 are placed as so-called tabs. As displayed on screen 953-2, titles fields 361/371 are less wide than content fields 362/372.

In the prior art, the application specification document (that causes the interpreter in each device to render the objects) needs to state location data for each object. For example, for device 903-1, a prior art application specification document comprises: "display (object 1, object 2, attribute 1, attribute 2)", wherein "display" indicates to render an object on the screen, "object 1" stands for object 360, "object 2" stands for object 370, "attribute 1" stands for a layout attribute with (X, Y) coordinates of object 1 on screen 953-1, "attribute 2" stands for the layout attribute with (X, Y) coordinates of object 2 on screen 953-1.

Since the coordinates are different for each object, objects 360 and 370 appear adjacent. In other words, the theme "adjacent" is contained in the rendering statement implicitly.

Similar, for example, for device 903-2, a prior art application specification document comprises a similar rendering statement, but with different layout attributes. The (X, Y) coordinates are indicates such that object 360 overlaps object 370. The rendering statement indicates the OVERLAP theme implicitly.

It is an advantage of the present invention that the theme must not longer be included into application specification document 240. Application specification document 240 states the following rendering statement 245 (cf. FIG. 5):

display (object 1, object 2, assembly)

In the example, statement 245 has 4 portions: "display" indicates to visually render objects on a screen; "object 1" stands for object 360 to be rendered; "object 2" stands for object 370 to be rendered; and "assembly" indicates that objects 360 and 370 are rendered in combination.

Direct or indirect inclusion of a theme (e.g., ADJACENT or OVERLAP) is not required by the invention. Interpreter 200 for device 903-1 (cf. FIG. 23) reads rendering statement 245 and identifies the presentation pattern (e.g., theme-handler 214) by comparing screen types. Depending on the screen width, the patterns are identified as ADJACENT or OVERLAP.

FIGS. 23 and 24 also help to illustrate a simplified second example. Objects 360 and 370 are rectangular ("tile-shaped", synonym to "frame-shaped"). Objects 360 and 370 are arranged in hierarchy with main tile 360 and sub tile 370. Statement 245 is part of application specification document 240 and is written in AS-language XML. Statement 245 comprises sub-statements that are conveniently numbered (1) to (8).

(245)

| | |
|---|---|
| (1) | < Tiles > |
| (2) |   < FrameTile idTile = "SN_General" title = > |
| (3) |     < TextBox id = "c:00000H "> |
| (4) |   < FrameTile idTile = "Cust_General" title = > |
| (5) |     < TextBox id = "c:11000H "> |
| (6) |   < TileSet title = "Notification" > |
| (7) |     < MainTile refTile = "SN_General" > |
| (8) |       < SubTile refTile = "Cust_General" > |

(1) Object definitions follow.
(2) Object 360 is a rectangular tile identified by "SN_General"
(3) Object 360 has content field 362 that displays a first text stored at a first address.
(4) Object 370 is a rectangular tile identified by "Cust_General".
(5) Object 370 has content field 372 that displays a second text stored at a second address.
(6) Assembly definitions follow; in the second example, an assembly is referred to as "tile set". The assembly belongs to an assembly type "notification" with hierarchical object rendering.
(7) Object 360 is the "main tile".
(8) Object 370 is the "sub tile"

Returning back to FIGS. 23 and 24, tiles 360 and 370 are rendered together as an assembly. Content fields 362 and 372 (i.e. texts or other attributes) are rendered with respect to the (X, Y) position of tiles 360 and 370, respectively. Content field 362 is rendered without consideration of content field 372, and vice versa.

Depending on the presentation pattern und depending on the hierarchy, tile 360 (main) is rendered on the left side (FIG. 23) or in the foreground (FIG. 24), and tile 370 (sub) is rendered on the right side (FIG. 23) or in the background (FIG. 24).

In the following, it will be explained how further different devices present the same application. The devices are a conventional telephone (cf. 902 in FIG. 5, cf. FIG. 25) and device 903 with display 953 (cf. FIG. 26).

FIG. 25 is a transcript of a dialog conducted over telephone (i.e. device 902) between the user and interpreter component 200. Conveniently, interpreter component operates on server computer 900 or operated on a further computer. The presentation pattern for device 902 is voice theme 345. In FIG. 25, the user is symbolized by a face; the arrangement of "speaking" and "listening" computer is symbolized by a square.

(1) Interpreter 200 starts an interactive voice synthesis/recognition system. The synthesis part of the system converts the following text-object (e.g., from data store services component 220) into voice:
   'Welcome to the telephony sales force automation system. Please select an item from the main menu. They are customers, contacts and activities.'
(2) The user selects 'contacts', preferably, by speaking this word.
(3) As confirmation, the synthesis part converts the following further text-object into voice: 'The selected item is Contacts'.
(4) The user instructs by 'search items with F', preferably, by speaking this phrase.
(5) The synthesis part converts the following further text-object into voice: 'There is one item. Item 1 . . . of . . . . The overview of the selected contact is as follows: The contact name is . . . . The email address is . . . . What would you like to do now? You can obtain information about the contact history for this contact. You can also obtain more information about this contact. Alternatively, you can go back to the main menu, or ask for repeating what you just heard.'
(6) The user instructs by 'check the contact detail', preferably, by speaking this phrase.

Figure 26:
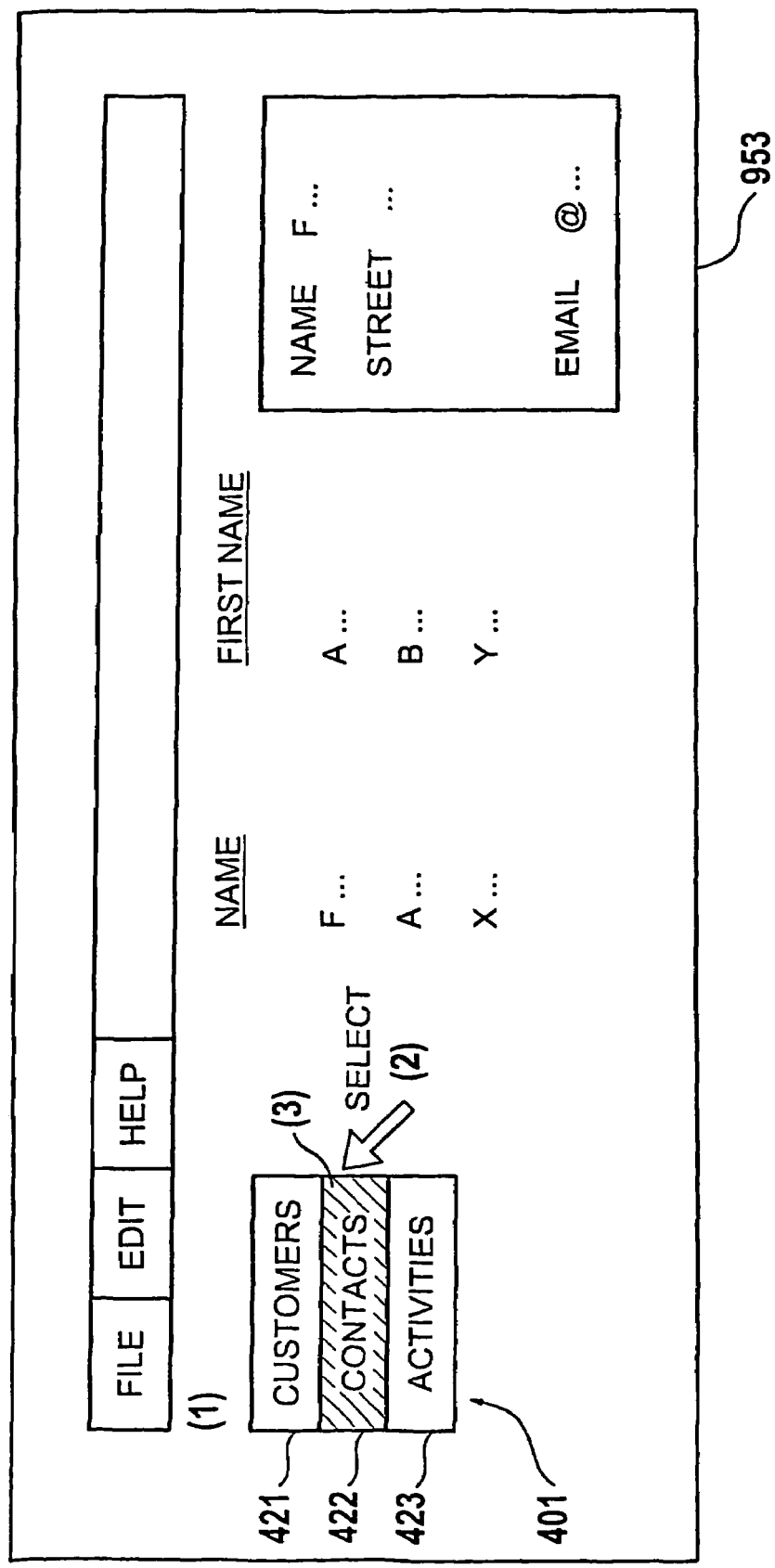
FIG. 26 is a screen shot of a computing device.

FIG. 26 is a screen shot of a computing device (e.g., device 903, screen 953).

(1) Interpreter 200 starts similar as with the telephone. The presentation pattern for this device is a tile stack theme (similar to 401/402 in FIG. 17). While the data is read, preferably, from the same application, rendering is different. Rendered is a first tile 421 with content 'customers', a second tile 422 with content 'contacts' and a third tile 423 with content 'activities'. The assembly of this tiles is a navigation bar.
(2) The user selects 'contacts', preferably, by double-clicking the tile 'contacts' (symbolized by cursor arrow in FIG. 26 pointing to 422).

(3) As confirmation, device 903 highlights the second tile 'contacts'. In other words, a highlight attribute is set so that the color of the second tile is different from the color of the first and third tiles. In FIG. 26, the color change is symbolized by hatching tile 422.

(4) Device 903 presents in graphic form essentially the same information as above (name, city, email-address, further options)

(5) The user selects 'contact . . . .'

Figure 27:
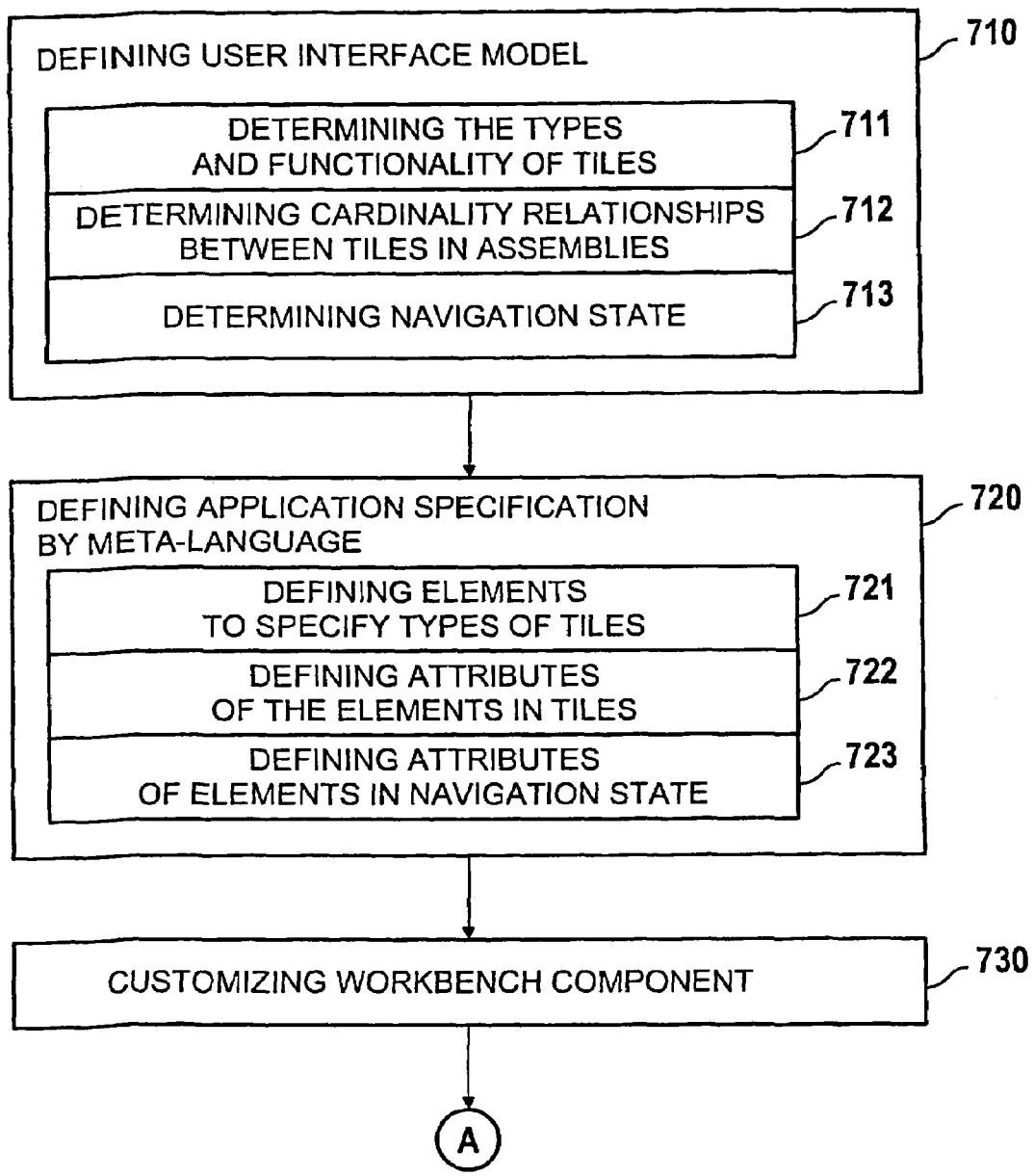
FIGS. 27,28 illustrates a method to create an application system.
Figure 28:
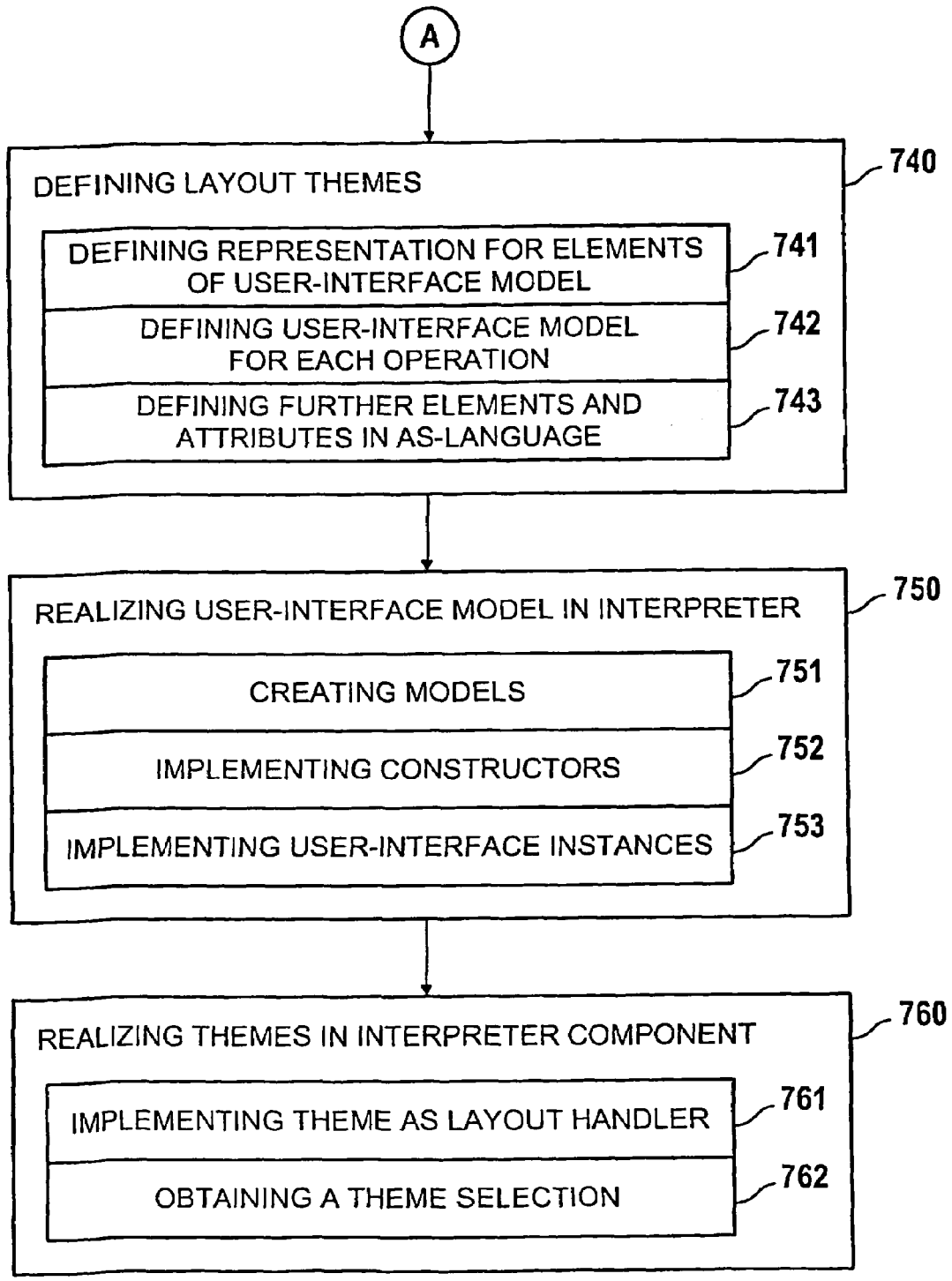

FIGS. 27 and 28 illustrate method 700 to create application system 200/250/260; method 700 comprises the following steps:

First step 710 is to define user-interface model 341 and comprises the following sub-steps:

711 determining the types and functionality of tiles 342 and of user-interface elements contained on tiles 342;

712 determining the cardinality (e.g., main-to-sub-hierarchy) and relationships between tiles 342 in assemblies 343, and, optionally, determining any particular requirements for operations between tiles 342 in certain specialized assemblies 342 (cf. FIG. 13 "SetAttributeValue"); and 713 determining navigation state 344, and the required user operations on a navigation state 344.

Second step 720 is to define the application specification by a meta-language and comprises the following sub-steps:

721 defining elements that specify the types of tiles 342, optionally defining user-interface elements (if contained in tiles 342), optionally defining containment relationships between the elements, and optionally defining attributes to express referential relationships between the elements;

722 defining attributes of the elements to express properties of tiles 342 and user-interface 340; and 723 defining attributes on the elements in navigation state 344.

Third step 730 is to customize workbench component 250 and comprises to create event handlers that identify constraints on the validity of application specification document 240. Events that can not be represented by the meta-language are not valid.

Fourth step 740 is to define layout themes 345 for computing device 901/902/903. For each computing device 901/902/903; fourth step 740 comprises the following sub-steps:

741 defining a representation on the output media (e.g., screen, speaker) of device 901/902/903 for each element of user-interface model 341;

742 defining user-interface model 340 for each operation (on user-interface model 341); and 743 optionally, defining additional elements and attributes in the AS-language (if required by the output representation and by operation of user-interface model 341)

Fifth step 750 is to realize user-interface model 341 in interpreter component 200. Fifth step 750 comprises the following sub-steps:

751 creating models (preferably, object models) to specify tiles 342 and assemblies 343, the models hereinafter referred to as "definition objects";

752 implementing constructors (cf. FIG. 16) for the definition objects, so that the objects create object model instances from application specification document 240 (or fragments thereof); and 753 implementing user-interface instances from the definition objects, in a computer programming language (CP-language).

Sixth step 760 is to realize themes 345 in interpreter component 200 and comprises for each theme 345 the sub-steps of:

761 implementing each theme as layout handler 214 (in a CP-language); and 762 obtaining a selection of theme 345 by the developer and forwarding the selection to interpreter component 200.

The present invention is now summarized as a computer-program product 103 (i.e., interpreter 200) that resides in computing device 903 (or 901,902) of either first type 903-1 or second type 903-2. The computer-program product 200 is provided for interpreting application specification document 240 and causing processor 913 of computing device 903 (cf. FIG. 1) to render first object 360 and second object 370 in combination (i.e. assembly, cf. FIGS. 23-24) to user-interface 963 (cf. FIG. 1) of device 903. The computer-program product has a plurality of instructions to control processor 913 and is characterized in the following:

A first sub-plurality of instructions form theme-handler 214 to evaluate statement 245 of the application specification document 240 (cf. FIG. 5), statement 245 instructing processor 913 to render objects 360 and 370 in an assembly 360/370 according to device type specific presentation pattern 295/296 for assembly 360, 370 that is identified from predefined first and second visual presentation patterns 295/296. A second sub-plurality of instructions form navigation engine 212 to select one of objects 360 and 370 for interaction with a user to create inter-object relations with user-interface elements and data cursors.

Table 1 is and example for a MDF-application specification language

TABLE 1

| (k) | Table 1 - Language Definition |
|---|---|
| (1) | <!-- XML Schema Extensibility for MDF schemas --> |
| (2) | . . . <I-- Attribute to support subtyping of document idrefs. Usage in schema: |
| (3) | <AttnbuteType dt:type="idref" ext:refType="xxx" ext:refScope="yyy"> |
| (4) | where xxx is/are the name(s) of tag(s) to which the attribute can refer, and yyy is/are the name(s) of the tag(s) which are the scope for the reference. Ids will only be matched if outside the innermost containing element with nodename from the set of tags yyy. |
| (5) | The document processing application is responsible for enforcing the subtyping. |
| (6) | <AttributeType name=refType" dt:type="strIng"/> <AttributeType name=ref Scope dt:type="string"/> <I- |
| (7) | Support layout displayUnit: attributed to containers that can be shown or hidden mergable = could be combined with parent Elements unmergable = never combined with parent elements |
| (8) | <AttributeType name="displayUnit" dt:type="enumeration dt:values="unmergable mergable"/> |
| (9) | <!-- Support for fragmentation --> <AttributeType name="fragment" dt:type="boolean"/> |
| (10) | <I-- Support for translation --> <AttributeType name="translatable" dt:type="boolean"/> |
| (11) | <!-- Descriptive text --> <AttributeType name="description" dt:type="string"/> |
| (12) | <!-- Support for allowing identification of layout-related attributes and tags --> <AttributeType name="layout" dt:type=enumeration dt:values="all VGA HVGA PPC"/> |
| (13) | <AttributeType name="length" dt:type="int"/> <AttributeType name=minLength dt:type="int"/> <AttributeType name="maxLength" dt:type="int"/> <I-- Next extension-attribute, if present, overrides dt:type --> <AttributeType name="type" dt:type="enumeration" dt:values="bin.hex bin.base64 filename Icon bitmap!> |
| (14) | <!-- Elements to support data-binding. Usage in schema: |
| (15) | <ElementType name=aaa . . . . > |

TABLE 1-continued

| (k) | Table 1 - Language Definition |
|---|---|
| (16) | SupportsType fieldType="xxx"/> |
| (17) | SupportsType . . . J>. . . |
| (18) | indicates that aaa can be bound to fields with type xxx, etc. |
| (19) | <AttributeType name=databinding dt:type="enumeration" dt:values="table field!> <AttributeType name="control" dt:type="boolean"/> <AttributeType name="fieldType" dt:type="enumeration" |
| (20) | dt:values="string number integer float boolean date time datetime enumeration/> |
| (21) | <ElementType name="SupportsType"> <attribute type="fieldType" required=yes/> </ElementType> </Schema> |

Table 2 is a simple Service Management demonstration program, defined with the MDF application language. For simplicity, table 2 has been abridged. For example, where "AttributeType" (or other statements) are repeated in consecutive line, the first 2 lines are kept and the other lines are replaced by ellipsis.

TABLE 2

| (k) | Table 2 - Application Specification in XML |
|---|---|
| (1) | <!-- MDF Application Schema, $Header$ --> . . . <Schema xmlns="urn:schemas-microsoft-com:xml-data" xmlns:dt="urn:schemas-microsoft-com datatypes" xmlns:ext="x-schema:SchemaExtension.xml" . . . |
| (2) | <ElementType name=~IdMap ext:description="Placeholder WBXML Id-Offset map"> . . . <AttributeType name=pointers~ dt:type=string/> . . . <attribute type=pointers required=yes/> </ElementType> . . . |
| (3) | <AttributeType name="constraintType dt:type="enumeration" dt:values="valldity foo bar"!> <ElementType name="Constraint" content="eltanly"> <attribute . . . |
| (4) | <AttributeType name="functionName" dt:type="string"/> <AttributeType name="event" dt:type="string"/> </AttributeType> <ElementType name="Function"> . . . |
| (5) | <ElementType name="Functioncall"> . . . <attribute type="functionName" required="yes"/> . . . |
| (6) | <element type="Argument" minOccurs="1 I> </ElementType> . . . |
| (7) | dt:values="mandatory high normal low"!> . . . <!-- Bitmap and Icon support --> . . . |
| (8) | <!-- new: Sorting --> . . . <AttributeType name="order" dt:type="enumeration" dt:values="ascending descending"!> <ElementType . . . name="SortKey" content="empty"> <attribute type="ref Field" required="yes"!> <attribute type="order" required="yes"!> <!ElementType> . . . <ElementType name="Search" content="eltOnly"> <ext:databindlng="field"!> |
| (9) | <!-- START DataModel schema --> . . . |
| (10) | <ElementType name="ConstantSelector" content="empty"> <attribute type="ref Field" required="yes"!> <attribute type="constant" required="yes"!> <!ElementType> . . . |
| (11) | <ElementType name="ParameterSelector" content="empty"> <attribute type="ref Field" required="yes"!> . . . |
| (12) | <!group> <!ElementType> <!-- Model the relationships directly --> . . . |
| (13) | <ElementType name=Relation" content="eltOnly"> <AttributeType name="table1" dt:type="idref" ext:refType="Table"!> <AttributeType name="table2 dt:type="idref" ext:refType="Table"!> . . . |

TABLE 2-continued

| (k) | Table 2 - Application Specification in XML |
|---|---|
| (14) | <AttributeType name="baseTable" dt:type="idref" ext:refType="Table"!> <AttributeType name="baseField" dt:type="idref" ext:refType="Field"!> . . . type="baseTable" required="yes"!> <attribute type="baseField" required="yes"V> <attribute type="referringTable" required="yes"!> <attribute type="referringField" relqured="yes"V> <!ElementType> . . . |
| (15) | <AttributeType name="link" dt:type="idref" ext:refType="ConstrainLForeignKeyV> . . . |
| (16) | <![CDATA[ One way of handling Complex fields: <Complex label="Address"> <Group compress="yes" separator="!n"> <ComplexSub datafleld="Addr1"!> <Break!> <ComplexSub datafleld="Addr2"!> <Break!> <Group comp ress= yes" separator=","> <ComplexSub datafleld="City"!> <ComplexSub datafleld="Region"!> . . . <!Group> <!Groups> <!Complex> . . . I]> <AttributeType name="idTile" dt:type="id"!> <AttributeType name="text" dttypeN"string"!> <AttributeType name="refTile" dt:type="idref" ext:refType= Tile"!> <AttributeType name="datafield" dt:type="idref" ext:refType="Field" ext:databindin~j=1ield"!>an"!> . . . |
| (17) | <!-- For element Row --> . . . <AttributeType name="col" dt:type="int" ext:layout="all"!> <AttributeType name="colspan" dt:type="int" ext:layout="all"!> <AttributeType name="allgn" dt:type="enumeration" dt:values="Ieft center right" ext:layout="aII"!> <AttributeType name="hspace" dt:type="int" ext:layout="all"!> . . . |
| (18) | <!-- For element GridPage --> <AttributeType name="wrap" dt:type="boolean" ext:layout="all"!> <AttributeType name="cols" dt:type="int" ext:layout="all"!> . . . |
| (19) | <!-- Code --> <ElementType name="EventHandler" content="eltOnly"> <attribute type="event"!> <group order= one"> <element type="InlineCode"!> <element type="FunctionCall"!> 4group> <!ElementType> . . . |
| (20) | <!-- Tilesets, Tiles, etc. --> <AttributeType name="targetFrame" dt:type="enumeration" dt:values="1 2 12 34 34 1234"!> <AttributeType name~dlsP~yGrouP" dt:type="lnt"!> . . . |
| (21) | <attribute type="title" required="yes"!> <attribute type="id" required="no"!> <attribute type="refTile" required="yes"!> . . . |
| (22) | <!ElementType> <ElementType name="MainTIIe"> <attribute type="title" relqured="yes"!> . . . |
| (23) | <!-- Controls --> <!~~ Next are advisory; may be overriden by Layout or Engine components --> <AttributeType name="minDisplayCharacters" dt:type="int"!> . . . |
| (24) | <ElementType name="Label" content="empty" ext:control="1"> <!--#Extends (DataControl) --> <attribute type="text" required="yes"!> <!ElementType> . . . |
| (25) | <ElementType name="TextBox" content="eltOnly" ext:control="1"> <!--#Extends (DataControl) --> <attribute type="label" required="no"!> . . . |
| (26) | <!-- <attribute type="type" required="no" default="string"!> --> <attribute type="importance" required="no" default="normal"!> . . . |
| (27) | <!-- OptionGroups and Checkboxes --> <ElementType name="Option" content="eltOnly" ext:control=" 1"> <attribute type="text" required="yes"!> . . . |

TABLE 2-continued

| (k) | Table 2 - Application Specification in XML |
|---|---|
| (28) | <!-- Special controls: Address --> <AttributeType name="addr1" dt:type="string"!> <AttributeType name="addr2" dt:type="string"!> <AttributeType name="city" . . . |
| (29) | <ElementType name="Address" content="eltOnly" ext:control="1"> <!--#Extends (DataControl) --> <attribute type="id" required="yes"!> <attribute type="importance" required="no" default="normal"!> |
| (30) | <!-- Shareable elements --> <ElementType name="Row" content="eltOnly" ext:displayUnit="mergable" ext:layout="all"> <group minOccurs="0" maxOccurs="~" order="many"> <!-- element type="DataControl" --> <element type="Address"!> <element type="DateTime"!> <element type="CheckBox"!> <element type="ComboBox"!> </group> <!ElementType> <ElementType name="Page" content="eltOnly" ext:displayUnit="mergable" ext:layout="all"> . . . |
| (31) | <!-- element type="DataControl" N> <element type="Address"!> <element type="DateTime"!> <element type="CheckBox"!> <element type="ComboBox"!> <element <!ElementType> <ElementType name="Tile" content="eltOnly" ext:displayUnit="unmergable" ext:fragment="1"> . . . |
| (32) | <!-- Top level --> <ElementType name="GUI" content="eltOnly"> <attribute type="title" required="yes"!> <attribute type="iconFile" required="no"!> <element type="DataModel" minOccurs="1" maxOccurs="1"!> <element type="Middleware" minOccurs="0" maxOccurs="1 O!> <element type=Tiles" minOccurs="1" maxOccurs="1"!> . . . |
| (33) | <!Schema> <!-- <element type="SortSpec" minOccurs="0" . . . |
| (34) | <!~~ Set field in new object --> <ElementType name="Field Value" content="eltOnly"> <attribute type="destField" required="yes"!> <attribute type="value" required="yes"!> <!ElementType>. . . |

LIST OF REFERENCE NUMBERS

| Reference | Meaning | FIG. |
|---|---|---|
| 100, 10q (q = 0 . . . 3) | computer program product | 1 |
| 200 | interpreter component | 3, 15 |
| 200/250/260 | application system | |
| 200-1 | client-side interpreter component | 5 |
| 200-2 | server-side interpreter component | 5 |
| 201 | database | 5 |
| 202 | graphical user-interface definition | 15 |
| 202-206 | XML-sub-system | 15 |
| 204 | data-model component | 2, 7, 15 |
| 206 | middleware-model components | 15 |
| 208 | device native user-interface services | 15 |
| 210 | tile handler | 15 |
| 210-220 | runtime sub-system | 15, 16 |
| 212 | tile assembly and navigation engine component | 15 |
| 214 | theme-handler component | 15 |
| 215 | parsing services component | 15 |
| 216 | data-event services component | 15 |
| 217 | constructor | 16 |
| 218 | data synchronization services component | 5, 15 |
| 219 | constructor | 16 |
| 220 | data store services component | 15 |
| 230 | application language definition document | 6 |
| 240 | application specification document | 3, 5, 6, 16 |
| 240-1 | specializing for particular device | 3 |
| 240-2 | encoding | 3 |
| 241 | interpreter-readable document | 3 |
| 242 | storage system | 3 |
| 245 | statement | 5 |
| 250 | workbench component | 3, 6, 11, 12, 13, 14 |
| 251 | typed document component | 6 |
| 252 | document cursor component | 6 |
| 253 | tree-viewer component | 6, 7, 11, 12, 13, 14 |
| 254 | element attribute panel component | 6, 7, 11, 12, 13, 14 |
| 255 | pre-viewer component | 6 |
| 258 | list | 12 |
| 259 | pop-up menu | 11 |
| 259-1 | menu item 'insert before' | 11 |
| 259-2 | menu item 'insert as child' | 11 |
| 260 | application specification language | 3 |
| 295 | predefined presentation pattern (ADJACENT) | 21 |
| 296 | predefined presentation pattern (OVERLAP) | 21 |
| 297 | predefined presentation pattern (CONSECUTIVE) | 21 |
| 299 | hierarchy pattern (MAIN, SUB) | 21 |
| 300 | application | 2 |
| 311 | table | 2 |
| 312 | table | 2 |
| 315 | interrelations | 2 |
| 320 | middleware-model component | 2, 7 |
| 321 | content of messages | 2 |
| 322 | definition of relations | 2 |
| 330 | business-logic component | 2 |
| 331 | functions | 2 |
| 332 | scripts | 2 |
| 340 | user-interface component | 2 |
| 341 | user-interface model | 2 |
| 341-1 | first implementation | text |
| 341-2 | second implementation | text |
| 342 | tile | 2, 7 |
| 343 | assemblies | 2, 7 |
| 344 | navigation state | 2 |
| 345 | theme, layout theme | 5 |
| 345-1 | micro-browser theme | 5 |
| 345-2 | voice theme | 5 |
| 345-3 | theme | 5 |
| 360 | first object | 23, 24, 8 |
| 360/370 | assembly of first and second objects | 23, 24 |
| 361 | title tile of first object | 23, 24, 8 |
| 362 | content tile of first object | 23, 24, 8 |
| 370 | second object | 23, 24 |
| 371 | title tile of second object | 23, 24, 8 |
| 372 | content tile of second object | 23, 24 |
| 401 | navigation bar | 17, 26 |
| 402 | navigation stack | 17 |
| 403 | hyperlink | 17 |
| 404 | main tile | 17 |
| 405 | sub tiles | 17 |
| 406 | menu | 18 |
| 407 | back arrow | 18 |
| 408 | toolbar | 18 |
| 409 | tab-strip | 18 |
| 410 | tab | 18 |

-continued

| Reference | Meaning | FIG. |
|---|---|---|
| 411 | sub-tiles | 18 |
| 412 | slot | 19 |
| 413 | slot | 19 |
| 414 | slot | 19 |
| 415 | slot | 19 |
| 417 | tile customer list | 19 |
| 418 | tile customer detail | 19 |
| 421 | tile | 26 |
| 422 | tile | 26 |
| 423 | tile | 26 |
| 500 | method | 22 |
| 501 | method steps by interpreter | 22 |
| 530 | specifying application by workbench | 22 |
| 532 | writing in AS-language | 22 |
| 534 | providing interpreter | 22 |
| 536 | storing interpreter | 22 |
| 538 | storing presentation pattern | 22 |
| 539 | simulating by pre-viewer component | 22 |
| 540 | receiving application specification document | 22 |
| 550 | interpreting statement to identify pattern | 22 |
| 560 | rendering assembly | 22 |
| 600 | process | 4 |
| 601 | defining application specifiation language | 4 |
| 602 | providing workbench component | 4 |
| 603 | providing an application specification document | 4 |
| 604 | specializing application specification document | 4 |
| 605 | encoding application specification document | 4 |
| 606 | storing interpreter-readable document | 4 |
| 607 | interpreting interpreter-readable document | 4 |
| 700 | method | 27-28 |
| 710 | defining user-interface model | 27-28 |
| 711 | determining the types and functionality of tiles | 27-28 |
| 712 | determining cardinality relationships between tiles in assemblies | 27-28 |
| 713 | determining navigation state | 27-28 |
| 720 | defining application specification by meta-language | 27-28 |
| 721 | defining elements to specify types of tiles | 27-28 |
| 722 | defining attributes of the elements in tiles | 27-28 |
| 723 | defining attributes of elements in navigation state | 27-28 |
| 730 | customizing workbench component | 27-28 |
| 740 | defining layout themes | 27-28 |
| 741 | defining representation for elements of user-interface model | 27-28 |
| 742 | defining user-interface model for each operation | 27-28 |
| 743 | defining further elements and attributes in AS-language | 27-28 |
| 750 | realizing user-interface model in interpreter | 27-28 |
| 751 | creating models | 27-28 |
| 752 | implementing constructors | 27-28 |
| 753 | implementing user-interface instances | 27-28 |
| 760 | realizing themes in interpreter component | 27-28 |
| 761 | implementing theme as layout handler | 27-28 |
| 762 | obtaining a theme selection | 27-28 |

-continued

| Reference | Meaning | FIG. |
|---|---|---|
| 900, 90q | computer | 1 |
| 901 | portable phone with micro-browser | 1, 5 |
| 901/902/903 | computing device, device | 1 |
| 902 | conventional phone | 1, 5 |
| 903 | personal computer, device in general | 1, 5 |
| 903-1 | device in general, first type | 5 |
| 903-2 | device in general, second type | 5 |
| 903-3 | device in general, third type | 5 |
| 910, 91q | processor (q = 0 ... 3) | 1 |
| 920, 92q | memory (q = 0 ... 3) | 1 |
| 930, 93q | bus (q = 0 ... 3) | 1 |
| 940, 94q | input device (q = 0 ... 3) | 1 |
| 950, 95q | output device, display, screen (q = 0 ... 3) | 1 |
| 951' | pre-viewer simulation of display | 20 |
| 953 | display | 1, 26 |
| 953-1 | display (first type) | 23, 17 |
| 953-2 | display (second type) | 24, 18 |
| 960, 96q | user-interface (q = 0 ... 3) | 1 |
| 970, 97q | program carrier | 1 |
| 970, 97q | program carrier | 1 |
| 980, 98q | program signal | 1 |
| 990 | inter-computer network | 1 |
| 999 | computer network system | 1 |

What is claimed is:

1. A method for rendering on a user-interface of a device an assembly of a first object and a second object that each present data of an application, the method comprising:

providing an interpreter specific for an application specification language used to write the application;

storing the interpreter in the device, the device being either of a first type or of a second type;

receiving, by the device, an application specification document that includes a statement with an indication to render the first and second objects in the assembly;

interpreting the statement of the application specification document using the interpreter to identify a presentation pattern for the assembly that defines a relation between at least two objects, the presentation pattern identified according to the type of the device from predefined first and second presentation patterns; and rendering the assembly of the first and second objects on the user-interface according to the presentation pattern identified during the interpreting of the statement.

2. The method of claim 1, further comprising:
simulating the rendering of the assembly by a pre-viewer component of a workbench used in a development computer.

3. The method of claim 1, further comprising:
storing the predefined presentation patterns by the interpreter.

4. The method of claim 1, wherein in the rendering step, the first object and the second objects are rendered according to the presentation pattern and to a predefined hierarchy pattern.

5. The method of claim 1, wherein the presentation pattern is as a display pattern, wherein the objects are rendered to the user-interface being a screen, and wherein the presentation pattern is identified according to the size of the screen.

6. The method of claim 1, wherein in the rendering step, the presentation pattern is an audio pattern.

7. The method of claim 1, wherein receiving an application specification document by the device includes:
automatically receiving an application specification document by the device from a server computer when application data changes on the server computer.

8. A computer-program product to visually render a first object and a second object in an assembly on screen of a computing device, the objects presenting data of an application on a computer that is at least temporarily coupled to the computing device, the computer-program product tangibly embodied in a computer-readable memory medium and having instructions that cause a processor of a computing device to:
provide an interpreter specific for an application specification language used to write the application;
store the interpreter in the computing device, the device being either of a first type or of a second type;
receive an application specification document from the computer, the application specification document having a statement with an indication to render the first and second objects in the assembly;
interpret the statement of the application specification document using the interpreter to identify a visual presentation pattern for the assembly that defines a relation between at least two objects, the visual presentation pattern identified according to the type of the device from predefined first and second visual presentation patterns; and
render the assembly of the first and second objects on the screen according to the visual presentation pattern identified in the interpreting step.

9. A method for creating an application system operating with a computing device and rendering on a user interface of the device an assembly of a first object and a second object that each present data of an application, the method comprising:
providing an interpreter component specific for an application specification language used to write the application, wherein providing the interpreter component comprises:
defining a user-interface model;
defining an application specification document by a meta-language;
customizing a workbench component that identifies constraints on the validity of the application specification document;
defining layout themes for the computing device;
realizing the user-interface model in an interpreter component; and
realizing the layout-themes in the interpreter component;
storing the interpreter component in the device, the device being either of a first type or of a second type;
receiving, by the device, an application specification document that includes a statement with an indication to render the first and second objects in the assembly;
interpreting the statement of the application specification document using the interpreter component to identify a presentation pattern for the assembly that defines a relation between at least two objects, the presentation pattern identified according to the type of the device from predefined first and second presentation patterns; and
rendering the assembly of the first and second objects on the user-interface according to the presentation pattern identified during the interpreting of the statement, wherein the rendering of the assembly comprises rendering the first object and the second object on the user interface of the device using the user interface model according to one of the layout themes for the device.

10. The method of claim 9, wherein defining a user-interface model includes:
determining the types of tiles and the functionality of tiles, the tiles being elements of the user-interface model;
determining relationships between the tiles in an assembly; and
determining a navigation state and the required user operations on the navigation state.

11. The method of claim 10, wherein defining an application specification document by a meta-language includes:
defining specifications to the types of tiles;
defining attributes to express properties of the tiles; and
defining attributes in the navigation state.

12. The method of claim 11, wherein defining layout themes for the computing device includes:
defining a representation on the output media of device for each element of the user-interface model; and
defining the user-interface model for each operation of the user-interface model.

13. The method of claim 12, wherein realizing the user-interface model in an interpreter component includes:
creating models to specify the tiles and the assembly;
implementing constructors to create user-interface instances from the application specification document; and
implementing the user-interface instances from the models in a computer programming language.

14. The method of claim 13, wherein realizing the layout-themes in the interpreter component includes:
implementing each layout-theme as a layout handler; and
obtaining a selection of the layout-theme by a developer and forwarding the selection to the interpreter component.

* * * * *